(12) United States Patent
Chambers

(10) Patent No.: US 11,897,432 B2
(45) Date of Patent: Feb. 13, 2024

(54) TAILGATE UTILITY RAIL AND ATTACHMENTS

(71) Applicant: Railias Holdings, LLC, San Diego, CA (US)

(72) Inventor: Casey M. Chambers, Carlsbad, CA (US)

(73) Assignee: RAILIAS HOLDINGS, LLC, San Diego, CA (US)

( * ) Notice: Subject to any disclaimer, the term of this patent is extended or adjusted under 35 U.S.C. 154(b) by 793 days.

(21) Appl. No.: 17/069,532

(22) Filed: Oct. 13, 2020

(65) Prior Publication Data

US 2021/0114529 A1    Apr. 22, 2021

Related U.S. Application Data

(63) Continuation-in-part of application No. 16/654,609, filed on Oct. 16, 2019, now Pat. No. 10,864,839.

(51) Int. Cl.
*B60P 7/08*     (2006.01)
*B60R 9/06*     (2006.01)

(52) U.S. Cl.
CPC ............ *B60R 9/06* (2013.01); *B60P 7/0815* (2013.01)

(58) Field of Classification Search
CPC ............ B60P 7/08; B60P 7/0807; B60R 9/06
USPC ................ 410/97, 100, 103, 106, 113–116
See application file for complete search history.

(56) References Cited

U.S. PATENT DOCUMENTS

| | | | |
|---|---|---|---|
| 6,848,873 B1 | 2/2005 | Husk | |
| 7,673,922 B1 | 3/2010 | Grimes | |
| 7,810,196 B1 | 10/2010 | Pritchard et al. | |
| 7,862,268 B2 * | 1/2011 | Dibner | B60P 7/135 410/97 |
| 8,303,221 B2 | 11/2012 | Lenz | |
| 10,864,839 B1 * | 12/2020 | Chambers | B60P 7/0815 |
| 2002/0012576 A1 * | 1/2002 | Anderson | B60P 7/0815 410/106 |
| 2003/0129038 A1 | 7/2003 | Addy | |
| 2006/0099044 A1 * | 5/2006 | Johnson | B60P 3/40 410/97 |
| 2007/0182192 A1 | 8/2007 | Meyers et al. | |
| 2008/0053930 A1 | 3/2008 | Rohde | |
| 2010/0215455 A1 * | 8/2010 | Burris | B60P 7/0807 410/100 |
| 2014/0263926 A1 | 9/2014 | LeAnna | |

OTHER PUBLICATIONS

International Search Report and Written Opinion dated dated Jan. 22, 2021, from the counterpart PCT application PCT/US20/55539.

* cited by examiner

*Primary Examiner* — Stephen T Gordon
(74) *Attorney, Agent, or Firm* — John L. Rogitz; John M. Rogitz

(57) ABSTRACT

A rail assembly is strapped to a tailgate and allows utility attachments to be quick-connected to the rail without the need for tools to connect and disconnect the utility attachments. The rail length can be configured for small, mid, and full-size truck tailgates. Thus, a one package-fits-all design is provided. Example features of the rail assembly include a dual buckle plate, a lock tab, one-piece rail extensions, hex key for assembly, and a trimmable strap pad.

16 Claims, 30 Drawing Sheets

TAILGATE UTILITY RAIL AND ATTACHMENTS

FIELD

This disclosure relates to adapter rails for truck tailgates to hold any one or more of an ecosystem of work and recreational products.

BACKGROUND

Trucks such as pick-up trucks typically have movable tailgates to enclose the bed of the truck. As understood herein, tailgates do not offer utility beyond containment, access, and extension.

SUMMARY

As further recognized herein, it would be advantageous to provide structure on a tailgate that can conveniently hold/mount any one or more of a variety of work and recreational products. In other words, the tailgate of any open bed truck (and select other vehicles) can be used to increase functionality for a multitude of end use purposes.

As disclosed further below, advantageously present principles do not require modifications to the vehicle for installation, or specific trade skills, or tools for installation beyond those included with the product. An ecosystem of products is easily and conveniently supported by the structures described herein.

Accordingly, an apparatus includes a flat elongated rail formed with a first surface bounded by left and right edges, and along each edge a respective row of openings formed in the surface for receiving an attachment base of an implement to be carried on a truck. The rail also includes left and right-side walls extending along the respective edges and oriented perpendicular to the surface. The side walls extend the length of the surface and terminate at opposed first and second ends. Left and right flexible straps extend the length of the surface and face a second surface of the rail that is opposed to the first surface. The straps are coupled to the first end and extend to the second end. A tightening assembly receives the straps for tightening and loosening the straps to engage the apparatus with a tailgate of a truck with the tailgate between the straps and bottom edges of the side walls.

The openings may be tang and latch style openings or shear pin style openings.

Plural rubber or plastic pads may be disposed along the second surface.

At least one of the sidewalls may be formed with at least one row of plural holes. At least one extension slide may be telescopically engaged with the rail to slide along the second surface and establish length of the apparatus. Fasteners may extend through the holes to engage the slide to prevent longitudinal movement of the slide relative to the rail.

The tightening assembly may include a flippable latch movable to a tightened configuration, in which the latch is disposed substantially flush against the first surface, and a loosen configuration, in which the latch is pivoted upward from the first surface.

At least one feeder bracket may be engaged with at least one of the straps to route the strap between a bottom edge of the tailgate and a truck bed to which the tailgate is movably attached.

At least one buckle may engage at least one of the straps with the first end of the rail.

The apparatus can include the attachment base of the implement. The apparatus can include the implement. The apparatus can include the truck.

In another aspect, an assembly includes at least one truck, at least one rail strapped to a tailgate of the truck, and at least one vocational or recreational implement mounted on the rail.

In another aspect, a method includes strapping at least one rigid rail to a tailgate of a truck and engaging a mount of a recreational or vocational implement with the rail.

In an embodiment, an apparatus includes a flat elongated rail formed with a first surface bounded by left and right edges. The rail has openings in the first surface for receiving a portion of an attachment base of an implement to be carried on a truck. Left and right flexible straps extend the length of the first surface and face a second surface of the rail that is opposed to the first surface. The straps are coupled to the first end and extend to the second end. A tightening assembly receives the straps for tightening and loosening the straps to engage the apparatus with a tailgate of a truck with the tailgate between the straps and the rail. The apparatus can include one or more features selected from the group consisting of or comprising:

- at least one dual buckle plate comprising a unitary body formed with left and right strap slots for engaging the left and right flexible straps, respectively;
- at least one flippable latch of the tightening assembly that is movable to a tightened configuration, in which the latch is disposed substantially flush against the rail, and a loosen configuration, in which the latch is pivoted upward from the rail. The latch is formed with a slot for receiving, in the tightened configuration, a locking tab extending from the rail, the locking tab comprising a hole for receiving a lock to lock the rail in the tightened configuration;
- at least one rail extension engageable with the rail for extending longitudinally therefrom and having two side tangs with at least one hole each to receive a respective connector oriented in a first dimension to engage the side tangs with the rail and a middle tang with plural holes to receive respective connectors oriented in a second dimension orthogonal to the first dimension to engage the middle tang with the rail;
- a hex key removably engaged with the apparatus and configured to be manipulated to adjust and configure the apparatus; and
- at least one pad disposed along the rail and comprising material thermoformed under heat and pressure to reduce fraying when trimmed.

In an embodiment, a kit of parts includes at least one rail, at least two straps to secure the rail to a tailgate, and one or more rail extensions selectively engageable with the rail and extendable therefrom. The kit may include at least one pad to cushion the rail and at least one latch to tighten the straps.

The details of the present application, both as to its structure and operation, can best be understood in reference to the accompanying drawings, in which like reference numerals refer to like parts, and in which:

DETAILED DESCRIPTION

Figure 1:
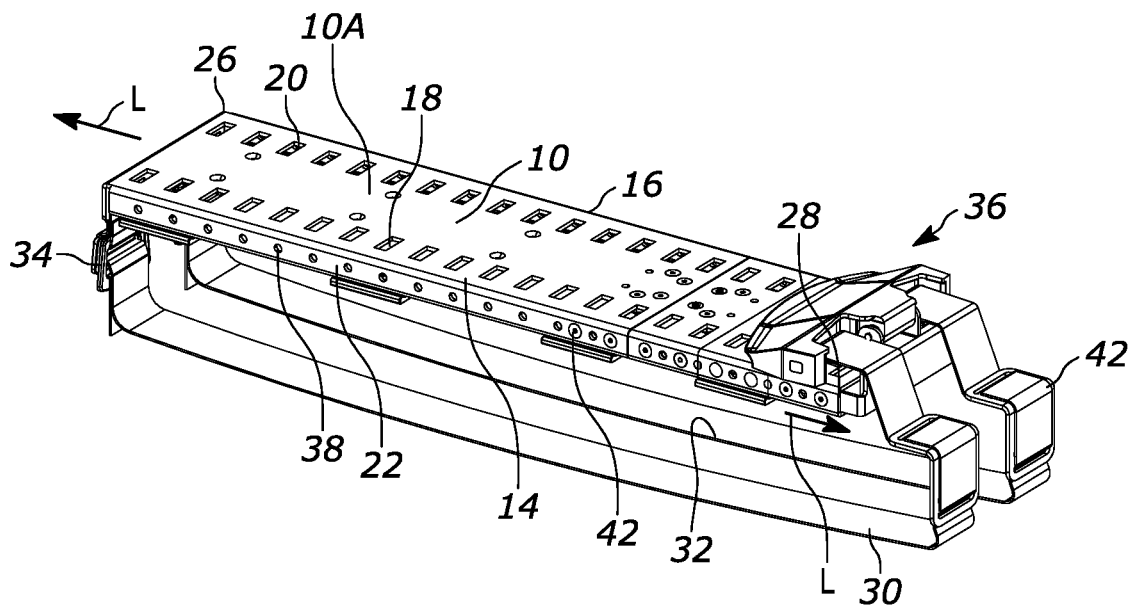
FIG. 1 is a perspective view of the rails with straps looking down at the top surface of the rail.
Figure 2:
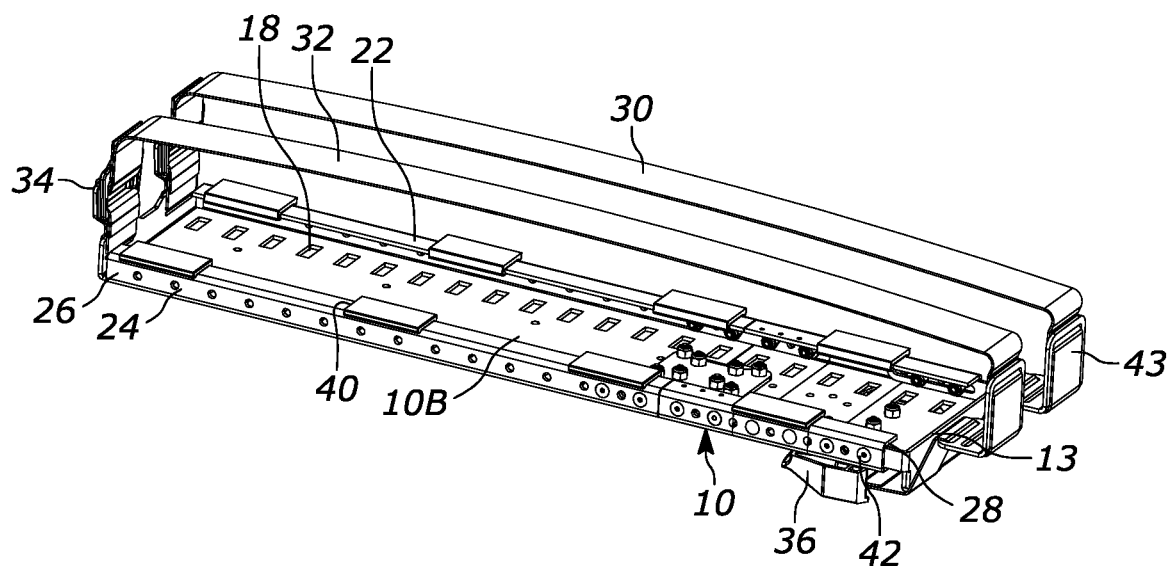
FIG. 2 is a perspective view of the rails with straps from the bottom of the rail.
Figure 3:
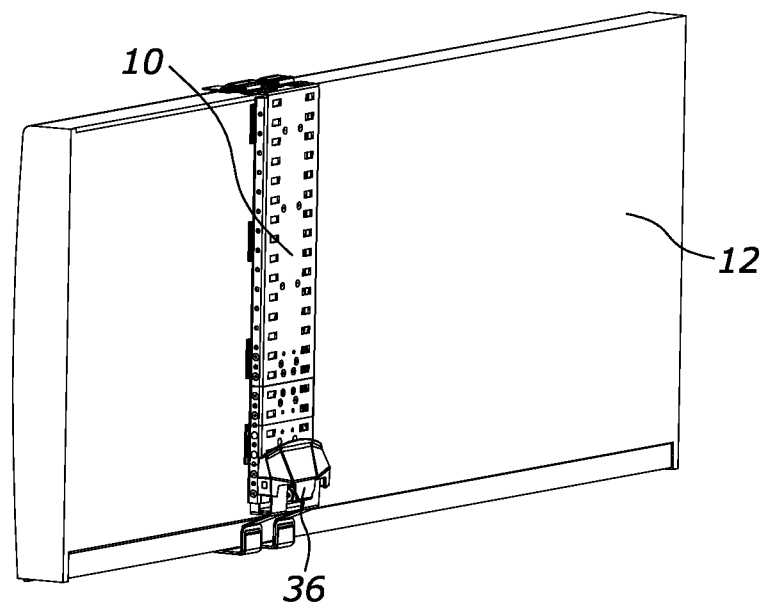
FIG. 3 is a perspective view of a truck tailgate looking at the tailgate from in front of the tailgate, showing the rail.
Figure 4:
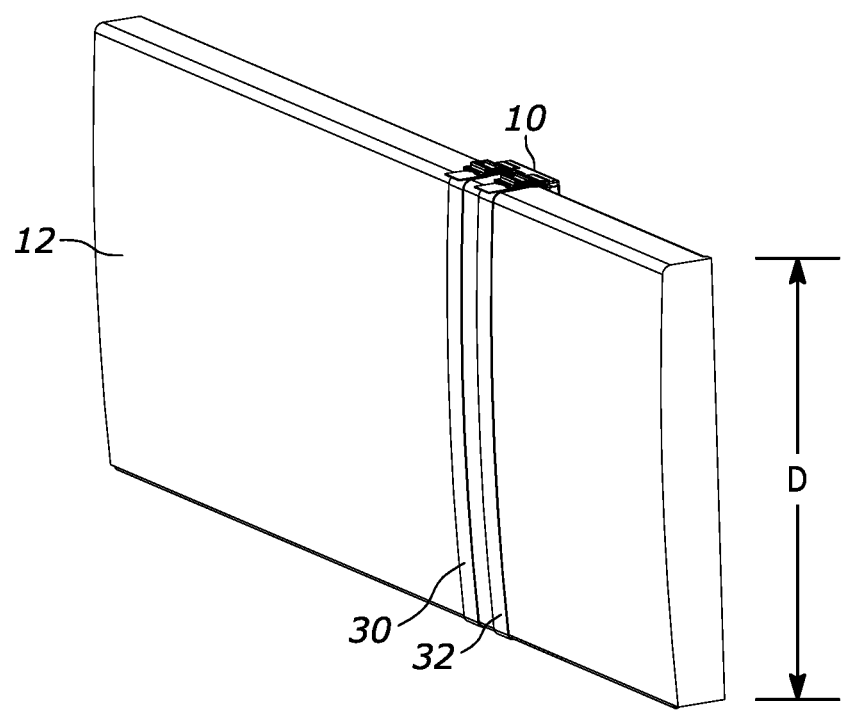
FIG. 4 is a perspective view of a truck tailgate looking at the tailgate from behind the truck, with the straps and a portion of the rail shown.
Figure 5:
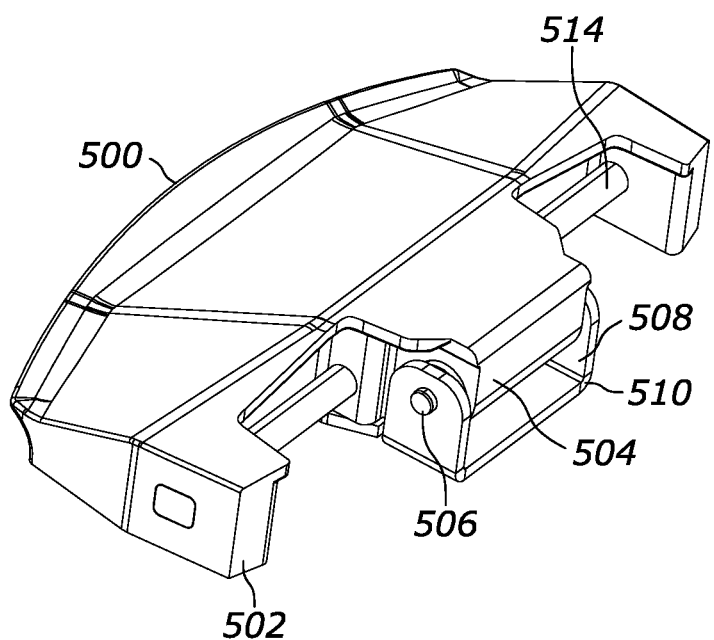
FIGS. 5-8 illustrate details of an example strap tightening mechanism.
Figure 6:
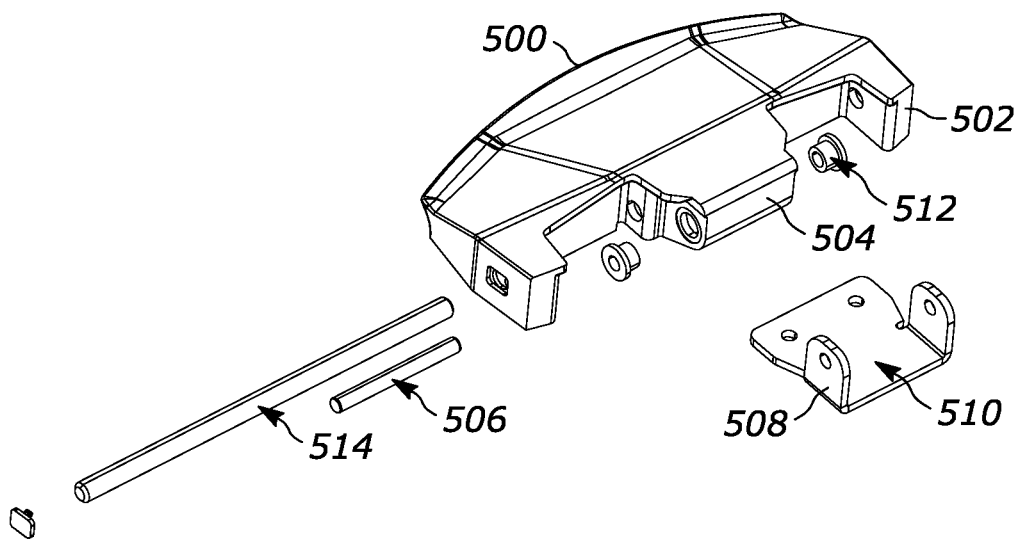

Referring initially to FIGS. 1-4 for a brief overview of an example embodiment of the present rail, a preferably elongated, flat, generally parallelepiped-shaped rigid rail 10 is shown that may be made of metal or hard plastic. The rail 10 has a length "L" that is sized for the smallest/shallowest truck bed sought to be accommodated, i.e., the length "L" is no more than depth "D" (as shown in FIG. 4, the vertical height when closed) of the smallest tailgate 12 sought to be accommodated. FIG. 2 best shows that an extension end is provided that can telescope to vary the length of the apparatus. In the example shown, part of the extension end may include a rail extension 13, discussed further below, that can telescopically engage the rail 10 to extend the rail structure for deeper truck beds. Like the rail 10, the rail extension 13 preferably is elongated, flat, generally parallelepiped-shaped, and rigid.

FIGS. 1 and 2 show that the rail 10 has a top surface 10A (FIG. 1) bounded by left and right edges 14, 16, and along each edge a respective row of openings 18, 20 are formed in the surface 10A for receiving an attachment base of an implement to be carried on a truck. As discussed further below, the openings 18, 20 may be tang and latch style openings or shear pin style openings.

Furthermore, the rail 10 also includes left and right-side walls 22, 24 that extend along the respective edges 14, 16 and that are oriented perpendicular to the top surface 10A. The side walls 22, 24 extend the length of the surface 10A and terminate at opposed first and second ends 26, 28.

FIGS. 1, 2, and 4 show that left and right flexible straps 30, 32 that can be made of webbing extend the length of the top surface 10A. As best shown in FIG. 2, the straps face a bottom surface 10B of the rail that is opposed to the top surface 10A. The straps 30, 32 are coupled to the first end 26 of the rail, in some implementations by respective buckles 34. The buckles 34 may be implemented as Double D cinch buckles to provide an easy pull-tight lock with quick release for the straps 30, 32. Each buckle 34 may be engaged with a respective webbing leash that attaches the buckles to the rail. The buckle functionality may be built into the rail 10.

As also shown, the straps 30, 32 extend to the second end 28, where a tightening assembly 36 receives the straps for tightening and loosening the straps to engage the apparatus with the tailgate 12, with the tailgate 12 sandwiched between the straps 30, 32 and bottom edges of the side walls 22, 24. The straps may be sewn to the tightening assembly.

In one example embodiment, the tightening assembly 36 includes a flippable latch that is movable to a tightened configuration, in which the latch is disposed substantially flush against the top surface 10A as shown in FIGS. 1-4, and a loosen configuration, in which the latch is pivoted upward from the top surface 10A. The tightening assembly 36 provides controlled and locked final tension on the straps 30, 32. It is to be understood that ratchets, flipping anchor plates, etc. may alternatively be used.

In the example shown, in addition to the structure discussed above, each of the side walls 22, 24 may be formed along their length with a respective row of spaced-apart holes 38. The rail extension 13 that is telescopically engaged with the rail 10 slides along the bottom surface 10B of the rail 10 for establishing length of the apparatus, and when the desired length is established, plural fasteners 42 are inserted through the holes 38 to engage the rail extension 13 to prevent longitudinal movement of the slide relative to the rail. To this latter end, the rail extension 13 may also be formed with side walls having a row of holes in them to register with the holes in the side walls of the rail 10.

Also, an arrangement of rubber or plastic pads 40 (FIG. 2) can be disposed along the bottom surface 10B. In the example shown, two rows of spaced-apart pads 40 extend along each edge of the rail 10. The pads inhibit motion of the rail on the tailgate and protect the tailgate from scratches. The pads 40 provide a contact area to transfer the holding force of the rail 10 to the tailgate 12 surface.

Concluding the discussion of FIGS. 1-4, L-shaped feeder brackets 43 may be engaged with the respective straps 30, 32 to route the straps 30, 32 between a bottom edge of the tailgate 12 and the truck bed to which the tailgate 12 is movably attached.

Now referring to FIGS. 5-8, one example embodiment of the tightening assembly 36 is shown is an over-center latch design that provides mechanical advantage for increased final strap tension. A latch handle 500 can include left and right arms 502 and between the arms 502 a central mount projection 504. The central mount projection 504 is formed with two transverse channels, one for receiving a hinge pin 506 that extends through the channel and eye flanges 508 of a mount bracket 510 that is configured to closely receive the central mount projection 504 by virtue of being complementarily-shaped to the central mount projection 504. If desired, flange bushings 512 may be sandwiched between the eye flanges 508 of the mount bracket 510 and the sides of the central mount projection 504 as shown. The mount bracket 510 is affixed to the rail 10, and the latch handle 500 can pivot about the pivot pin 506.

Figure 7:
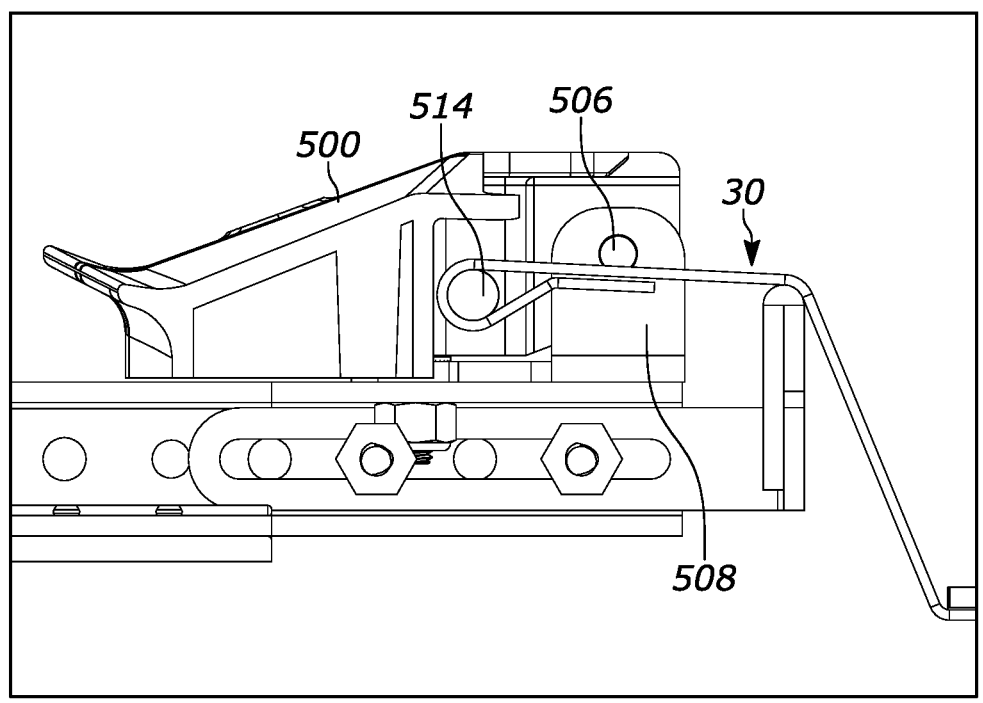
Figure 8:
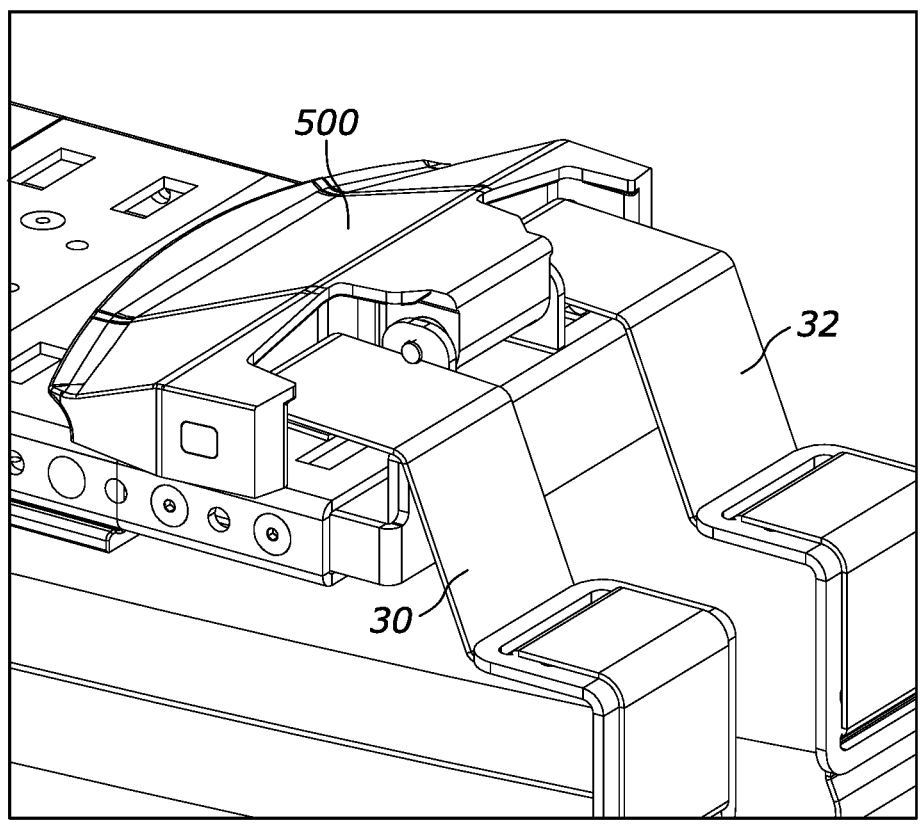

A tensioning rod 514 may extend through the other transverse channel in the central mount projection 504, with the ends of the tensioning rod 514 being received in or abutting against the left and right arms 502. The straps 30, 32 are routed around the tensioning rod 514 as shown best in FIG. 7, with the straps extending between the left and right arms 502 and the central mount projection 504. After being routed around the tensioning rod 514, the ends of each strap may be sewn to a more proximal portion of the strap as shown in FIG. 7.

Figure 9:
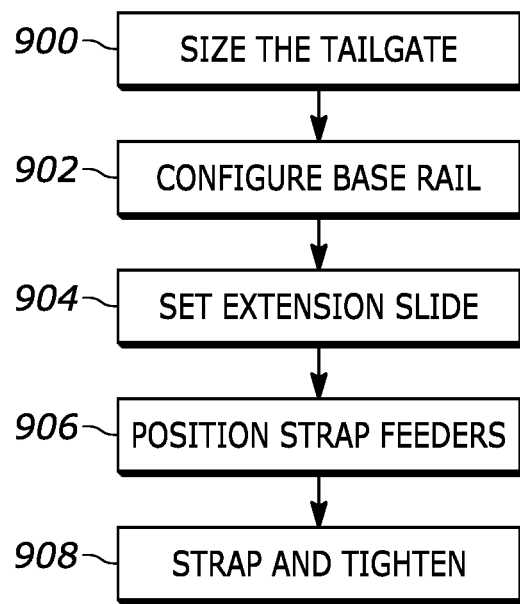
FIG. 9 is a flow chart of installation steps.

Now referring to FIG. 9, the attachment process for engaging the rail 10 with the tailgate 12 is shown. Commencing at block 900, the tailgate is sized, then at block 902 the rail 10 is configured. Moving to block 904, the rail extension 13 is set into the rail 10, and at block 906 the feeder brackets 42 are positioned between the bottom of the tailgate and the truck bed. The assembly is then strapped to the tailgate at block 908 and the straps tightened. Blocks 900-906 need be executed only during initial installation.

Figure 10:
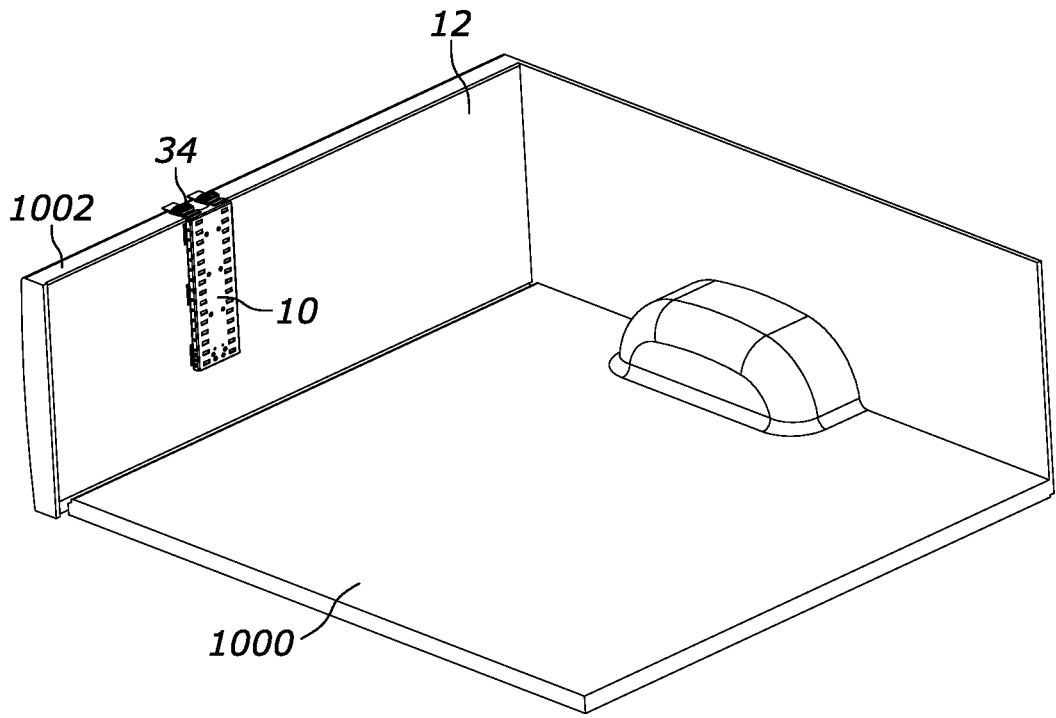
FIG. 10 is a perspective view of the inside of the tailgate showing the first installation step.

FIG. 10 illustrates further details of block 900. With the tailgate 12 up to enclose a truck bed 1000, the rail 10 is held on the tailgate's inside surface and positioned such that the buckles 34 are resting on the top edge 1002 of the tailgate 12. The distance from the lowest edge of the rail 10 to the truck bed surface is measured as indicated at "b" in FIG. 10. A table correlating the distance "b" to various extensions of differing lengths is used to select the extension slide configuration needed.

Figure 11:
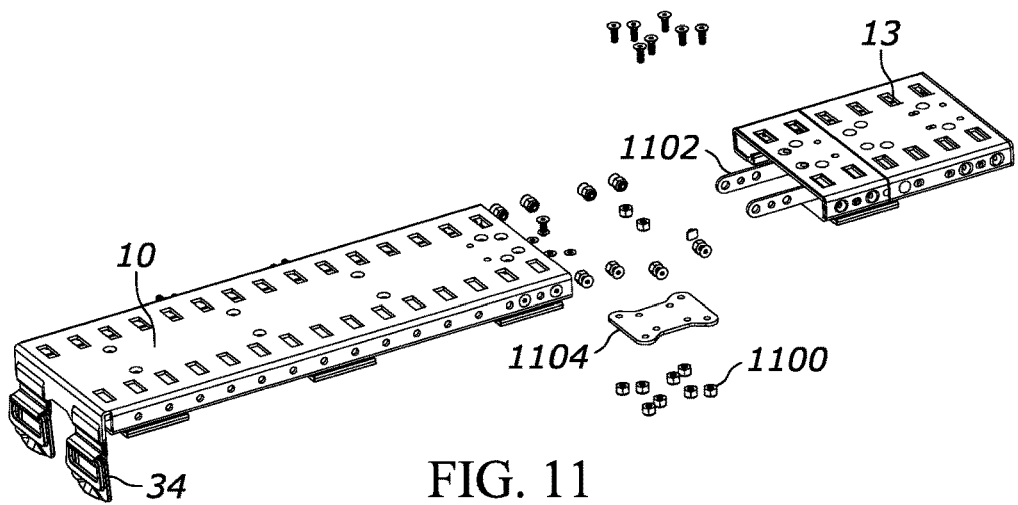
FIGS. 11, 11A, and 11B are perspective views showing the second installation step.
Figure 11A:
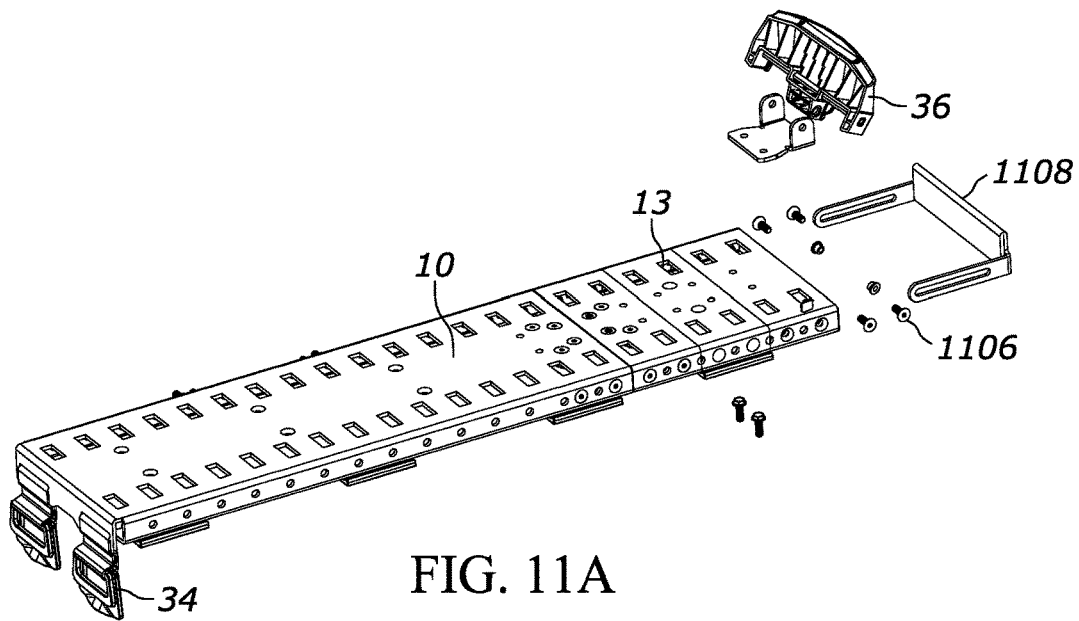
Figure 11B:
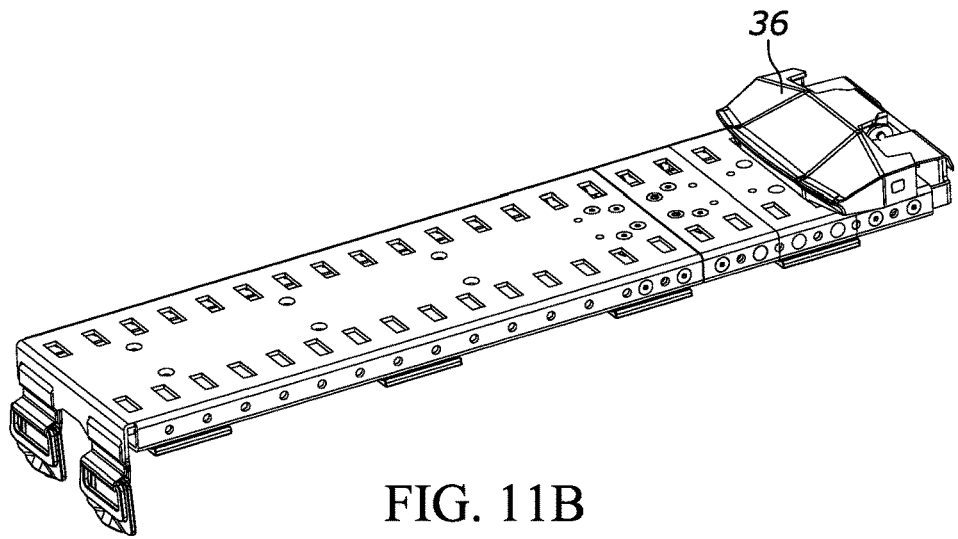

The step at block 902 of FIG. 9 is illustrated in FIGS. 11, 11A, and 11B. In the example shown, assume that the step at block 900 indicates that a "long" rail extension 13 is indicated. The rail extension 13 is fastened to the rail 10 using fasteners 1100 that extend through both top surface openings and side rail holes of the rail 10 and rail extension 13 that are registered with each other. If desired, one or more side connector plates 1102 and one or more central connector plates 1104 may be used to interface between the rail 10 and rail extension 13. Only a single unitary interface plate may be used. The unitary interface plate may be integral to the rail extension, i.e., made of the same piece of material as the rail extension. The tightening assembly 36 is then attached to the extension 13 using tightening assembly fasteners 1106. Note that the straps 30, 32 are not shown in FIGS. 11, 11A, and 11B but that the straps at this point are looped around and hang from the tensioning rod 514 of the tightening assembly 36. The rail extension 13 is telescopically engaged with an extension slide 1108 to establish the length of the combined rail apparatus. Thus, the extension can be created by affixing components (such as the rail extension 13) to the rail 10 and/or engaging telescoping components (such as the extension slide 1108) to the extension end of the assembly.

Figure 12:
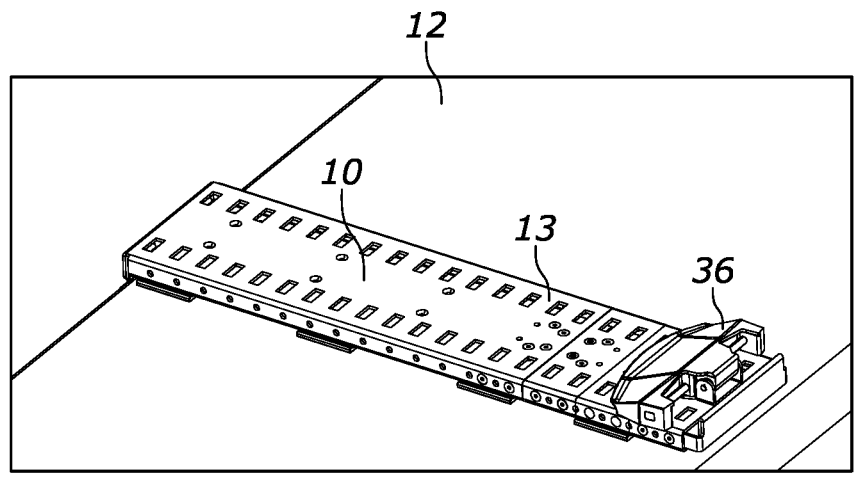
FIGS. 12 and 12A are perspective views showing the third installation step.
Figure 12A:
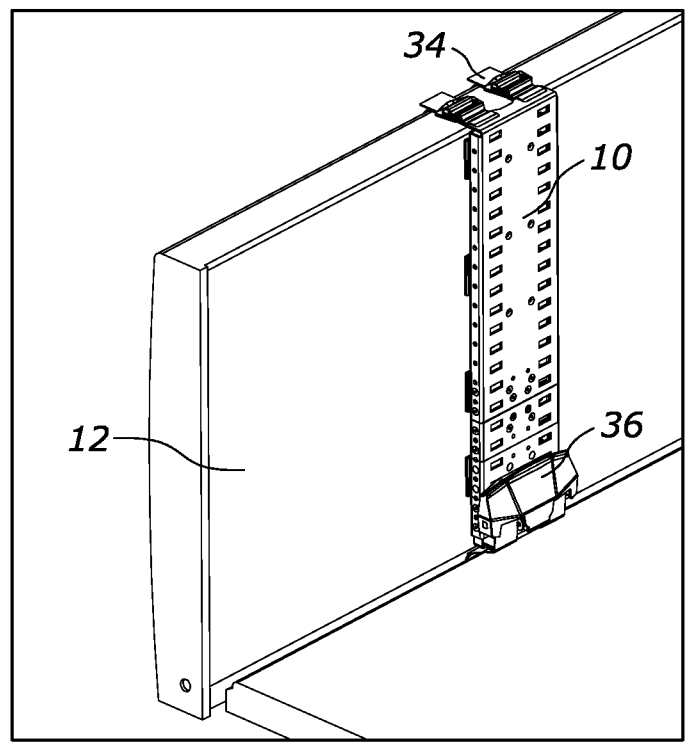

FIGS. 12 and 12A illustrate the step executed at block 904 in FIG. 9. As shown, the rail extension 13 is set by first replacing the rail 10-rail extension 13 assembly onto the inside surface of the tailgate 12 with the rail 10 along the tailgate 12 approximately where it will be used. This will ensure optimal setup. The rail extension 13 is pulled downward to within a short distance (e.g., a quarter inch) from the truck bed surface. And then the tailgate 12 is opened while maintaining the position of the rail extension 13, which is then tightened fully to the rail 10 using the fasteners described above.

Figure 13:
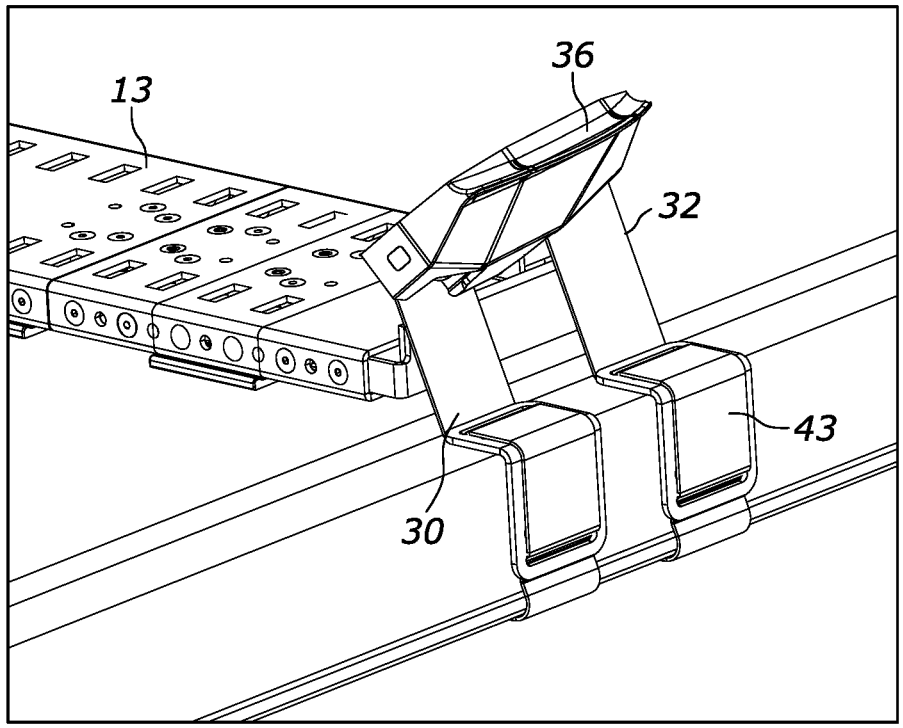
FIGS. 13 and 13A are perspective views showing the fourth installation step.
Figure 13A:
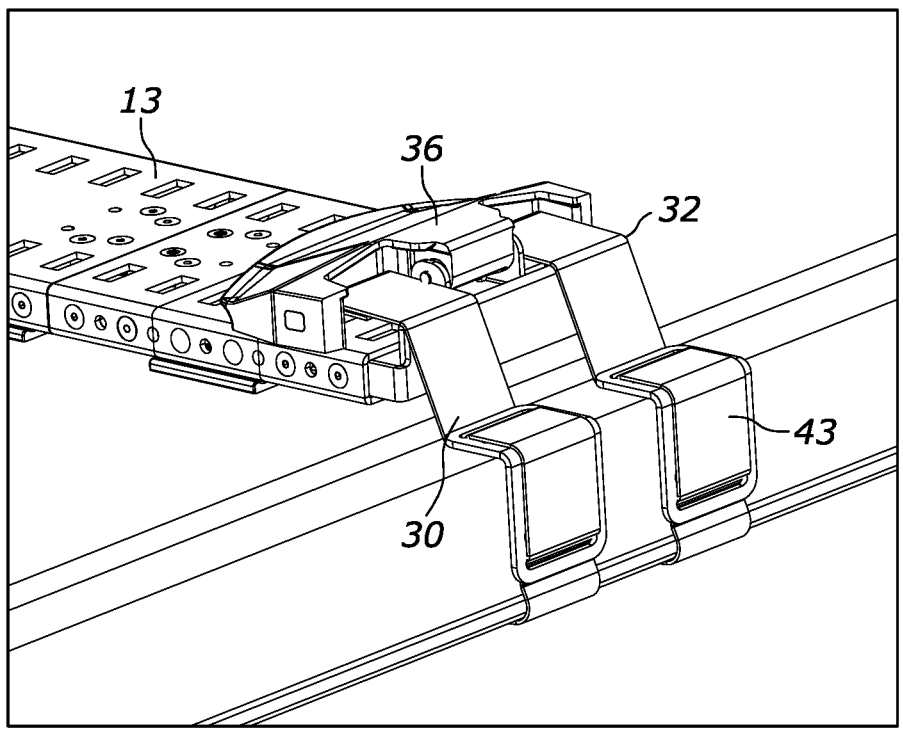
Figure 14A:
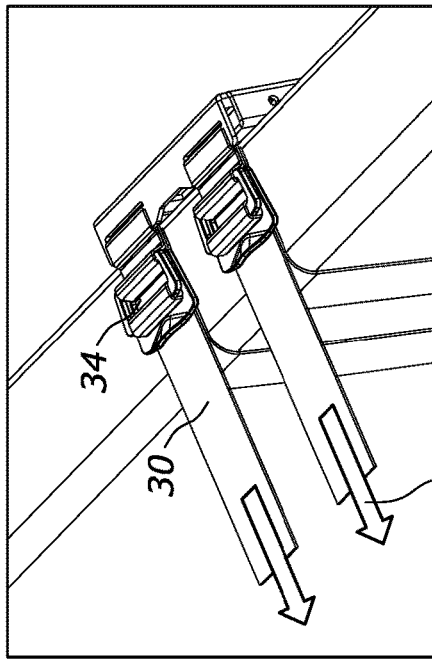
FIGS. 14, 14A, 14B, and 14C are various views of the rail showing the fifth installation step.
Figure 14C:
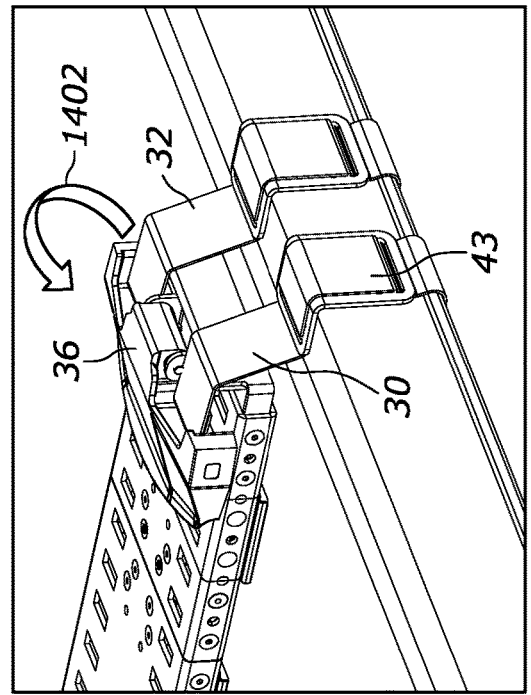
Figure 14:
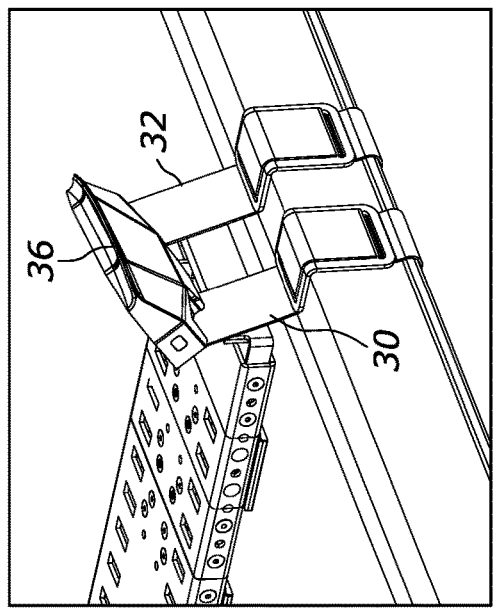
Figure 14B:
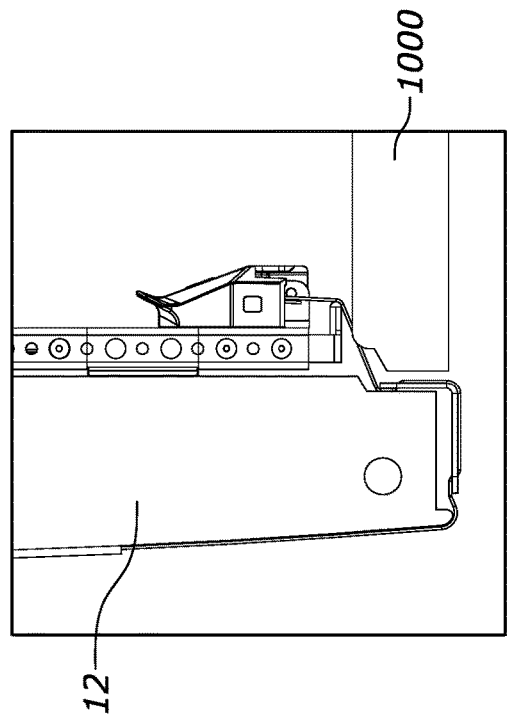

FIGS. 13 and 13A illustrate the step at block 906 in FIG. 9. The feeder brackets are slid toward the rail extension 13. With the tailgate 12 down and the rail 10 in position, the straps 30, 32 are fed through the gap between the tailgate 12 and the truck bed and out toward the rim of the tailgate 12. With the tightening assembly 36 down (FIG. 13A, i.e., in the tightened configuration), the feeder brackets 43 are positioned on the straps 30, 32 such that the brackets 43 hug the tailgate corner transition as close as possible.

FIGS. 14, 14A, 14B, and 14C illustrate the step at block 908 in FIG. 9. The tightening assembly 36 is moved to the loosen configuration and the straps 30, 32 are fed through the buckles 34. The straps are pulled tight as indicated by the arrows 1400 in FIG. 14A. If desired the tailgate may be attempted to be closed without significant resistance and further adjustments of the straps made accordingly. In the event that the straps 30, 32 interfere with the truck bed at the gap between the bottom of the tailgate and truck bed, the rail extension 13 or feeder brackets 43 may be adjusted to reduce interference. After ensuring that the area underneath the tightening assembly 36 is clear, the tightening assembly 36 is moved down against the rail extension 13 (or rail 10 as appropriate) to the tightened configuration as indicated by the arrow 1402 in FIG. 14C.

Figure 15:
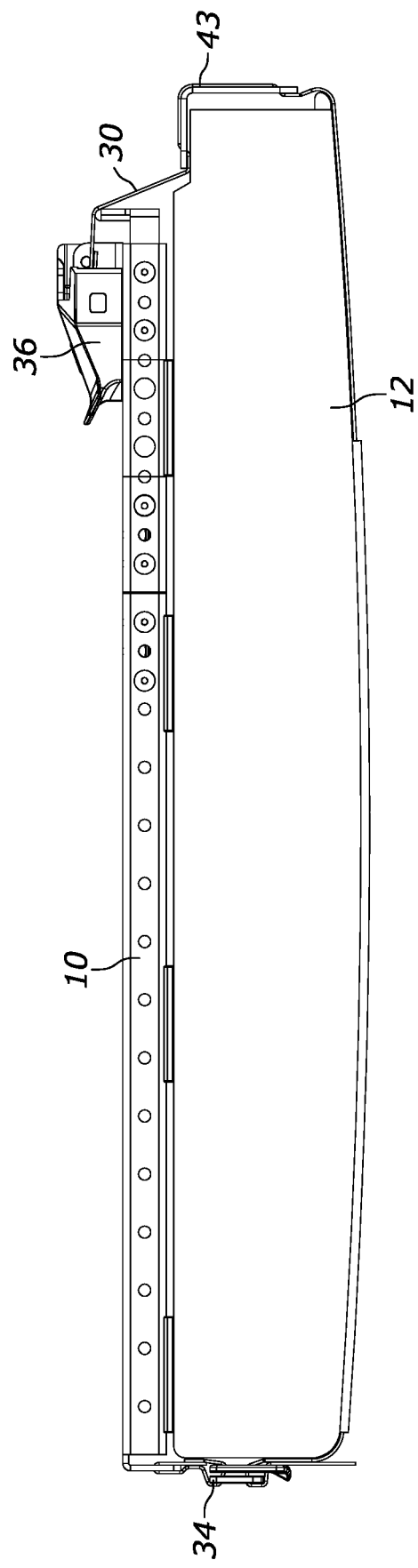
FIG. 15 is a side elevational views of the strap tightened to the tailgate.

FIG. 15 illustrates the result of the above in elevational side view.

As indicated above, the attachment openings 18, 20 in the top surface 10A and/or the holes 38 in the sidewalls 22 of the rail 10 may be implemented in multiple ways to hold a base of a work or recreational implement, examples of which are disclosed herein. One of the ways the openings may be embodied is a shear pin style shown in FIGS. 16, 16A, 16B, 17, 18, and 18A.

Figure 16:
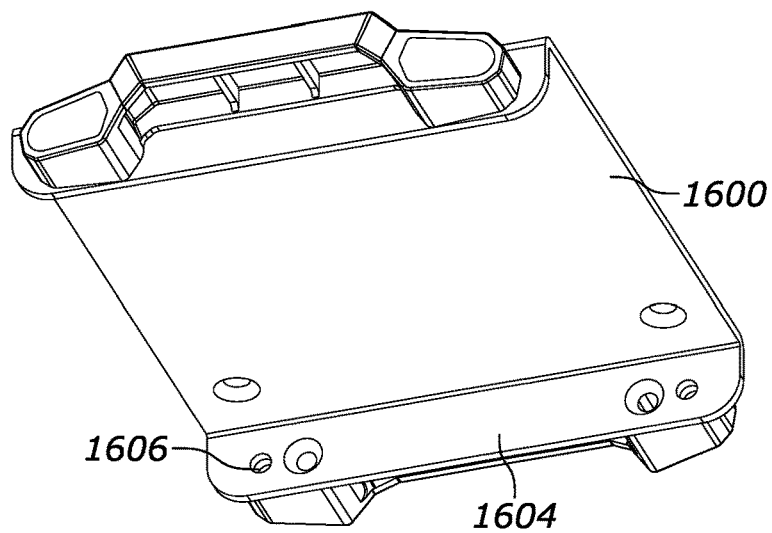
FIGS. 16, 16A, and 16B illustrate a shear pin style opening.
Figure 16A:
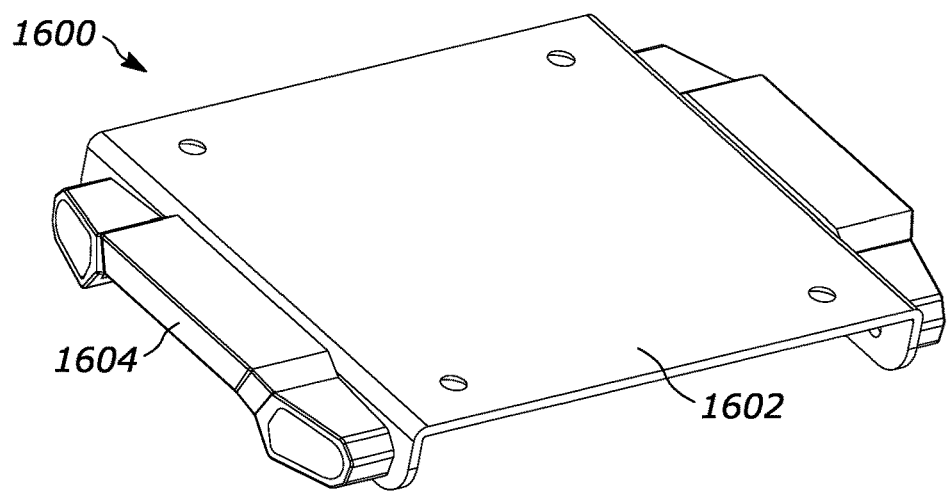
Figure 16B:
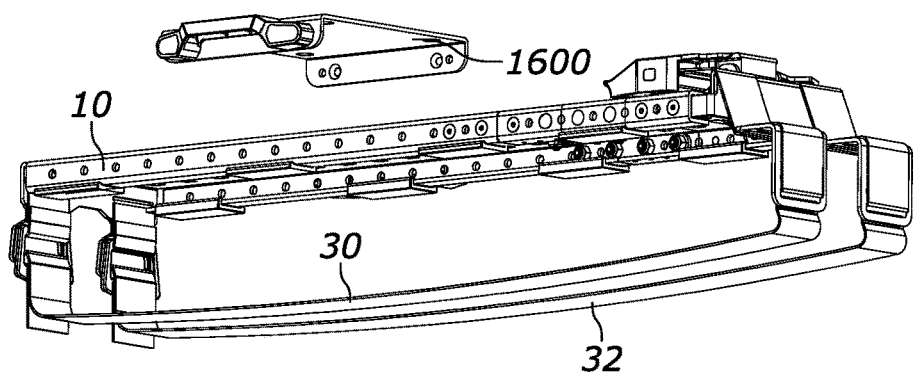

As shown in FIGS. 16, 16A, and 16B, an attachment interface 1600 such as a flat plate has a top surface 1602 for mounting an implement thereon. The interface 1600 may include left and right sides 1604 in at least one of which are reciprocatingly mounted spring-loaded pins 1606. The example shown, two pins 1606 are mounted in a side 1604. The pins 1606 maintain the interface 1600 on the rail 10 in the presence of shear forces between the two components. The "U" channel of the interface 1600 formed by the top surface 1602 and sides 1604 constrains movement in the axial direction of the pins.

Figure 17:
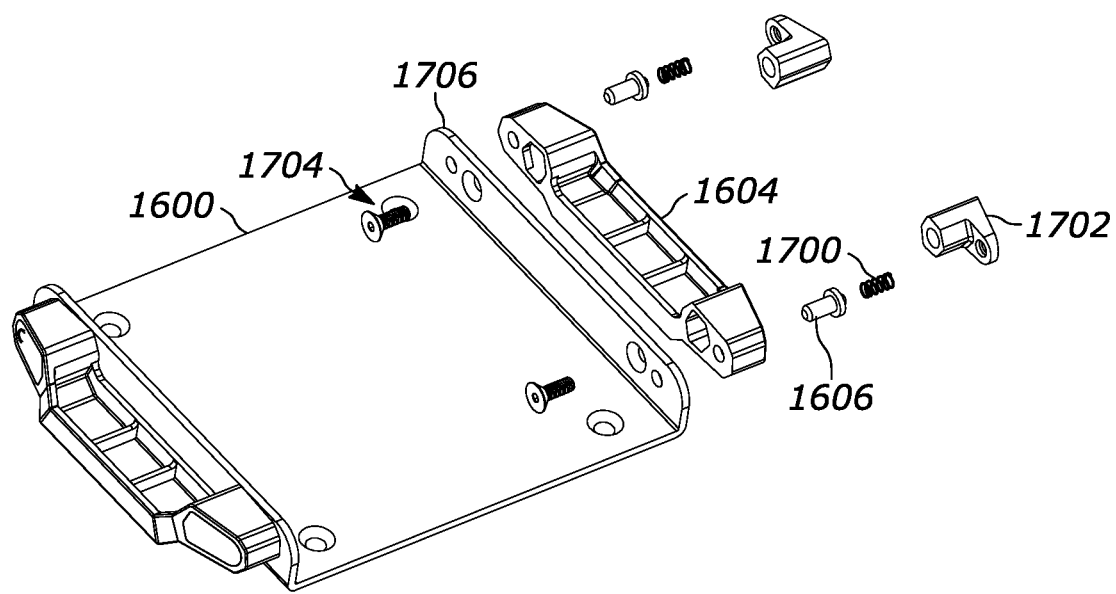
FIG. 17 is an exploded perspective view of the shear pin embodiment.

FIG. 17 is an exploded view illustrating the pins 1606 with respective springs 1700 sandwiched between the outer ends of the handles 1604 and respective spring blocks 1702. Fasteners 1704 may extend through flanges 1706 that are perpendicular to the flat plate and through the separately formed sides (handles) 1604 to engage fastener channels in the spring blocks 1702. The handles are connected to the pins for the user to latch and unlatch the attachment base 1600 from the rail 10.

While two handles are shown, a single handle may be preferred. Therefore, one side would have a handle attached to spring loaded pins and the other would have short fixed pins.

Figure 18:
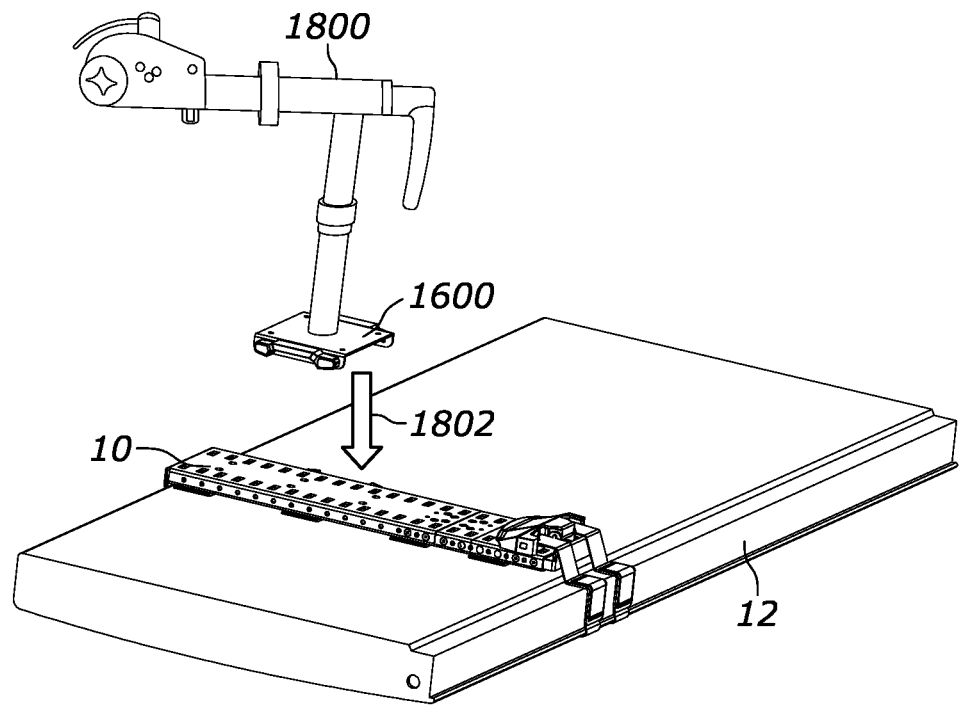
FIGS. 18 and 18A are perspective views showing an example attachment base (for a bicycle work stand) being mounted on the rail using the shear pin embodiment.
Figure 18A:
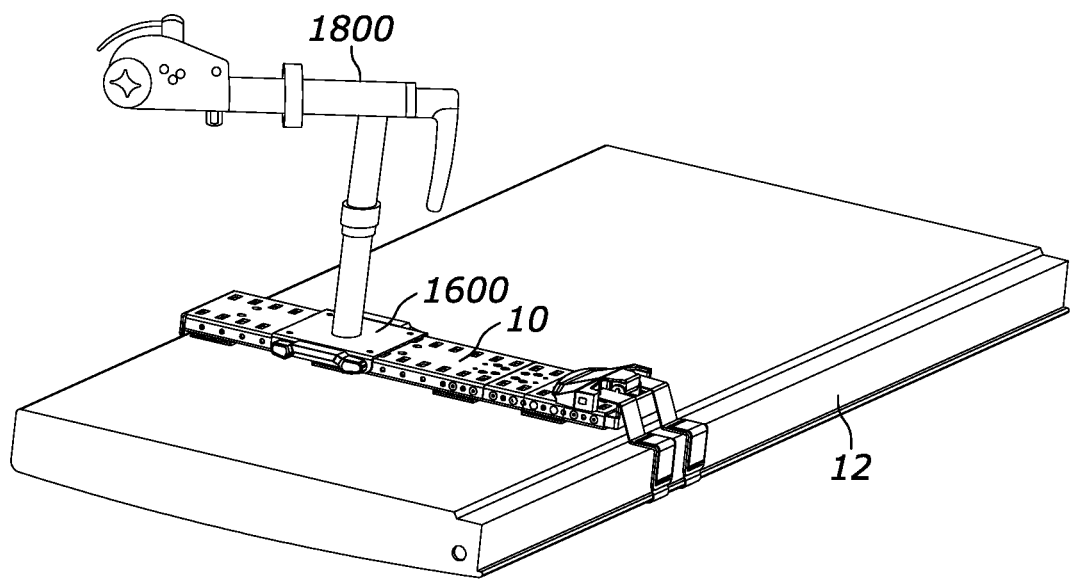
Figure 19:
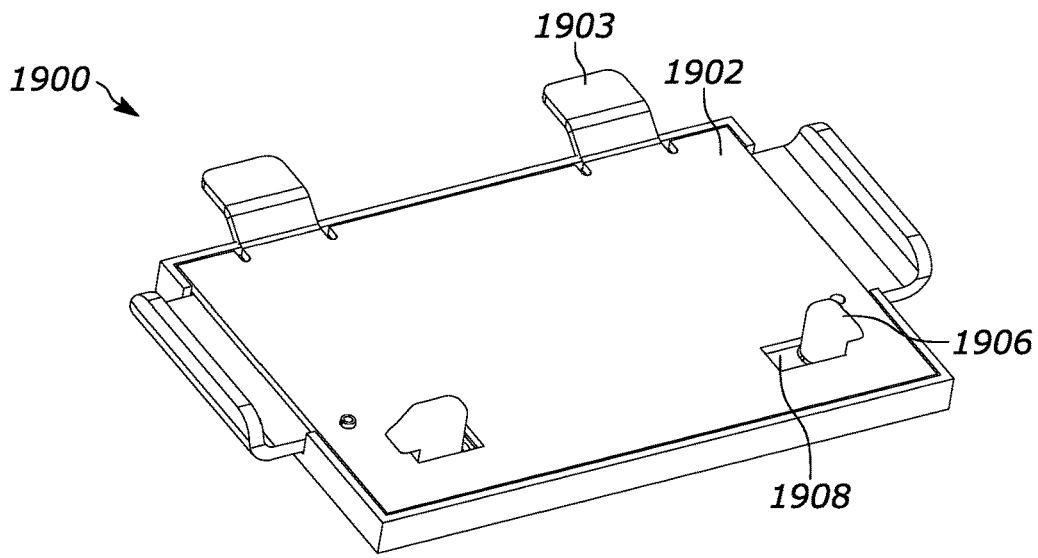
FIGS. 19, 19A, and 19B illustrate a tang and latch opening.
Figure 19A:
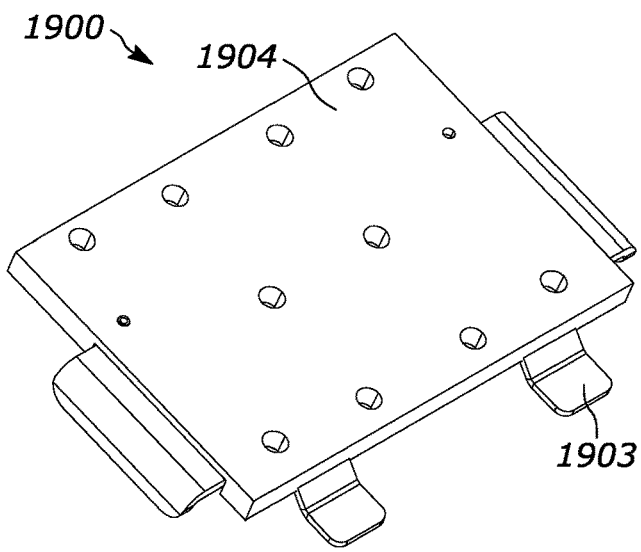
Figure 19B:
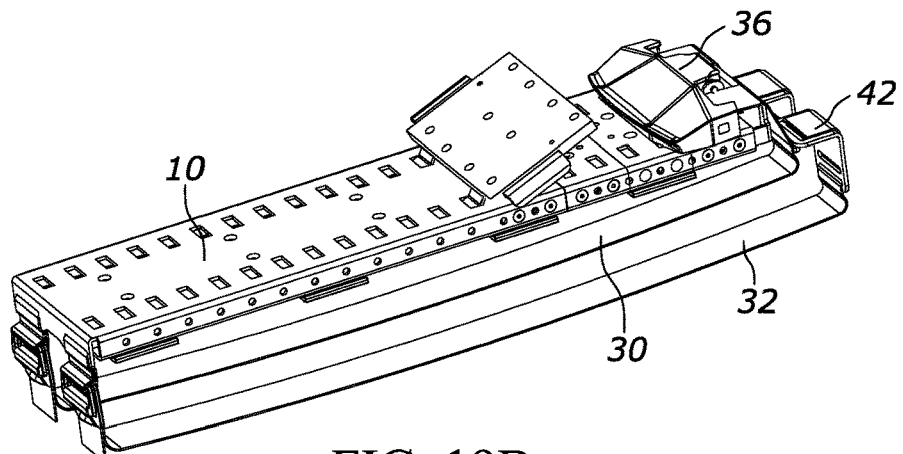

FIG. 18 illustrates the interface 1600 supporting an implement 1800, in the non-limiting example shown, a bicycle stand. As indicated at 1802 the interface 1600 is lowered onto the rail 10 on the tailgate 12 with the pins being retracted away from the rail using the handles. Once the interface 1600 is on the rail 10, the handles are released, and the pins are urged by the springs into the holes 38. FIG. 18A illustrates the implement in its final (useful) position.

FIGS. 19, 19A, 19B, 20, 21, and 21A illustrate openings in the top surface of the rail 10 and/or holes in the sidewalls thereof in a tang and latch configuration. In the example shown, the openings 18, 20 in the top surface 10A of the rail 10 are shown with rectilinear shapes. A two-piece interface 1900 includes a flat parallelepiped-shaped tang base plate 1902 with two "Z"-shaped tangs 1903 extending laterally away from one side of the base plate 1902. The interface 1900 also includes a generally parallelepiped-shaped housing 1904 that closely receives the base plate 1902 within the sides of the housing 1904 as shown. Two latch teeth 1906 on the housing 1904 protrude through respective rectilinear openings 1908 in the base plate 1902 on the side of the base plate 1902 opposite the tangs 1903 as shown.

Figure 20:
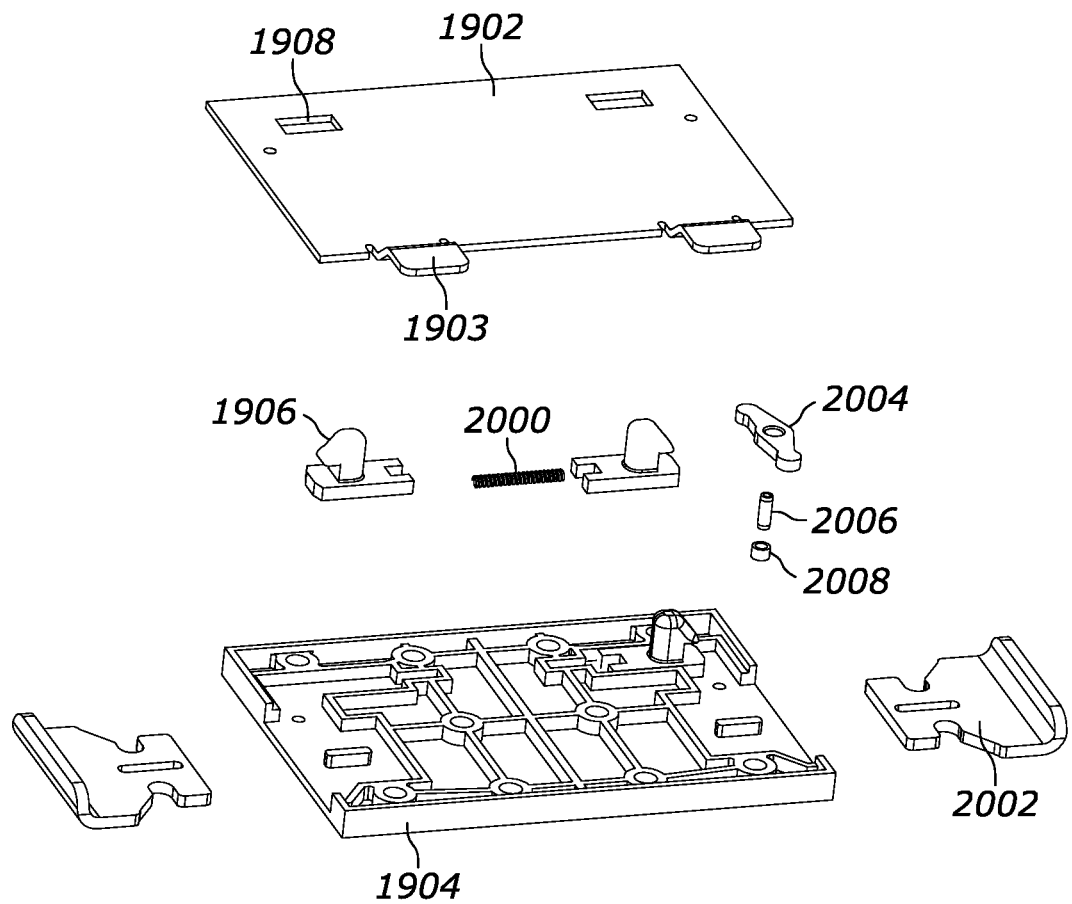
FIG. 20 is an exploded perspective view of the tang and latch embodiment.
Figure 21:
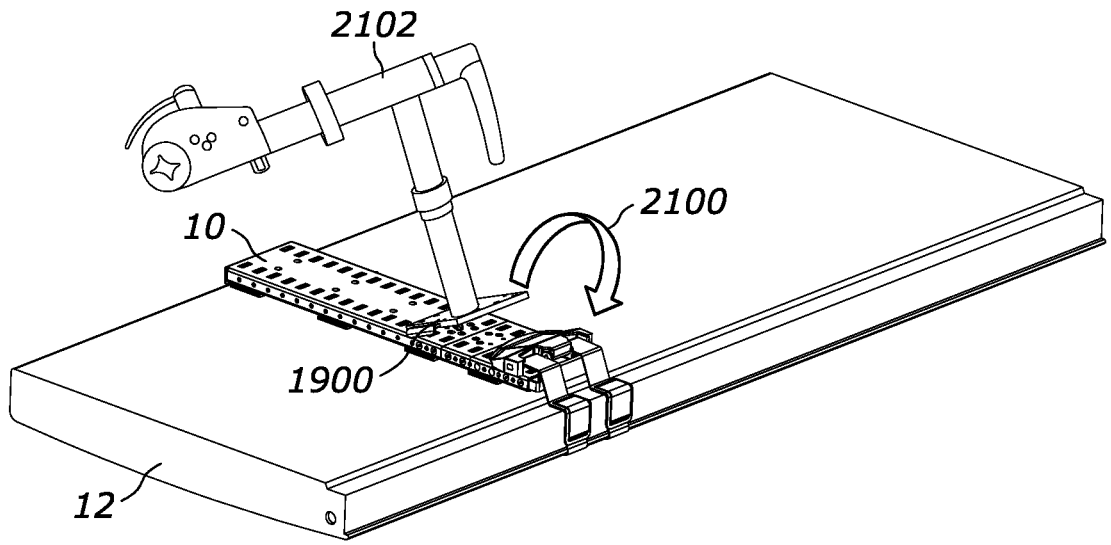
FIGS. 21 and 21A are perspective views showing an example attachment base (for a bicycle work stand) being mounted on the rail using the tang and latch embodiment.
Figure 21A:
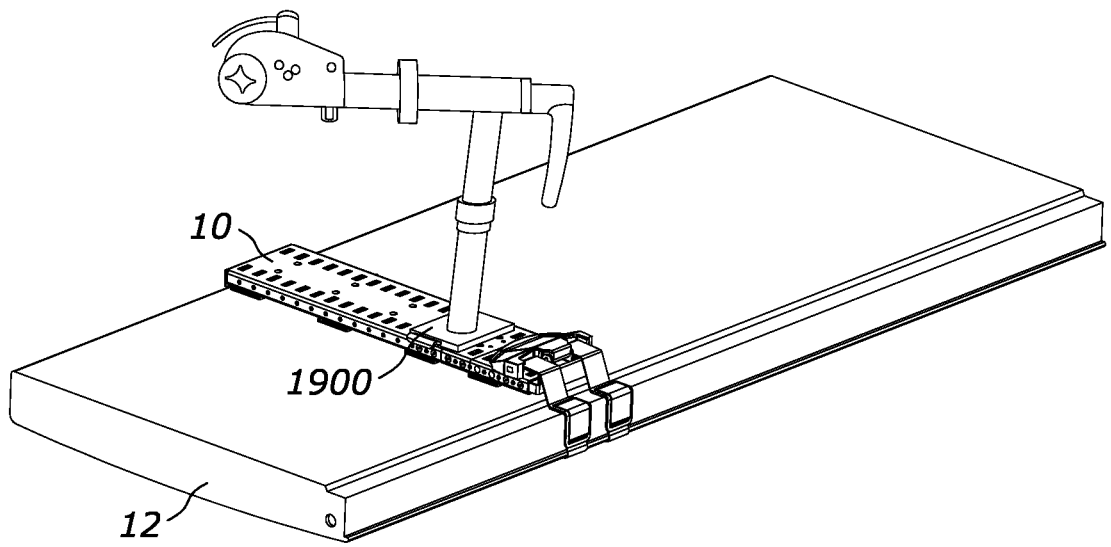

As best shown in FIG. 20, a respective spring 2000 abutting structure in the housing 1904 urges each latch 1906 laterally outward. Opposed handles 2002 are slidably engaged with the housing 1904 and are manipulable to urge the latches 1906 inward against the spring force. In effect, the handles 2002 are spring loaded and are used to retract the latches 1906 for disengagement with the base plate 1902.

FIG. 20 also shows that each latch 1906 may be engaged with a respective lever 2004 that receives a respective bushing 2008 and then a hinge pin 2006 that in turn may be radially supported on the housing 1904 and/or by the base plate 1902.

To connect the interface 1900 to the rail 10, the tangs 1903 are inserted into two of the openings 18, 20 in the top surface 10A of the rail 10. To do this, as indicated at 2100 in FIG. 21 the interface 1900 is lowered and rotated onto the rail 10. As this occurs, the latches 1906 begin to enter two of the openings 18, 20 in the top surface 10A of the rail 10. The ramped surfaces on the latches 1906 ride on the peripheries of the openings to automatically retract the latches against the bias of the springs 2000. Once clear of intervening structure, the latches 1906 are free to move under spring bias to the latched position to engage the rail 10 along with the tangs 1903. The handles 2002 may be subsequently used to remove the interface 1900 from the rail 10. An implement 2102 typically is mounted on the interface 1900 as shown.

Figure 22:
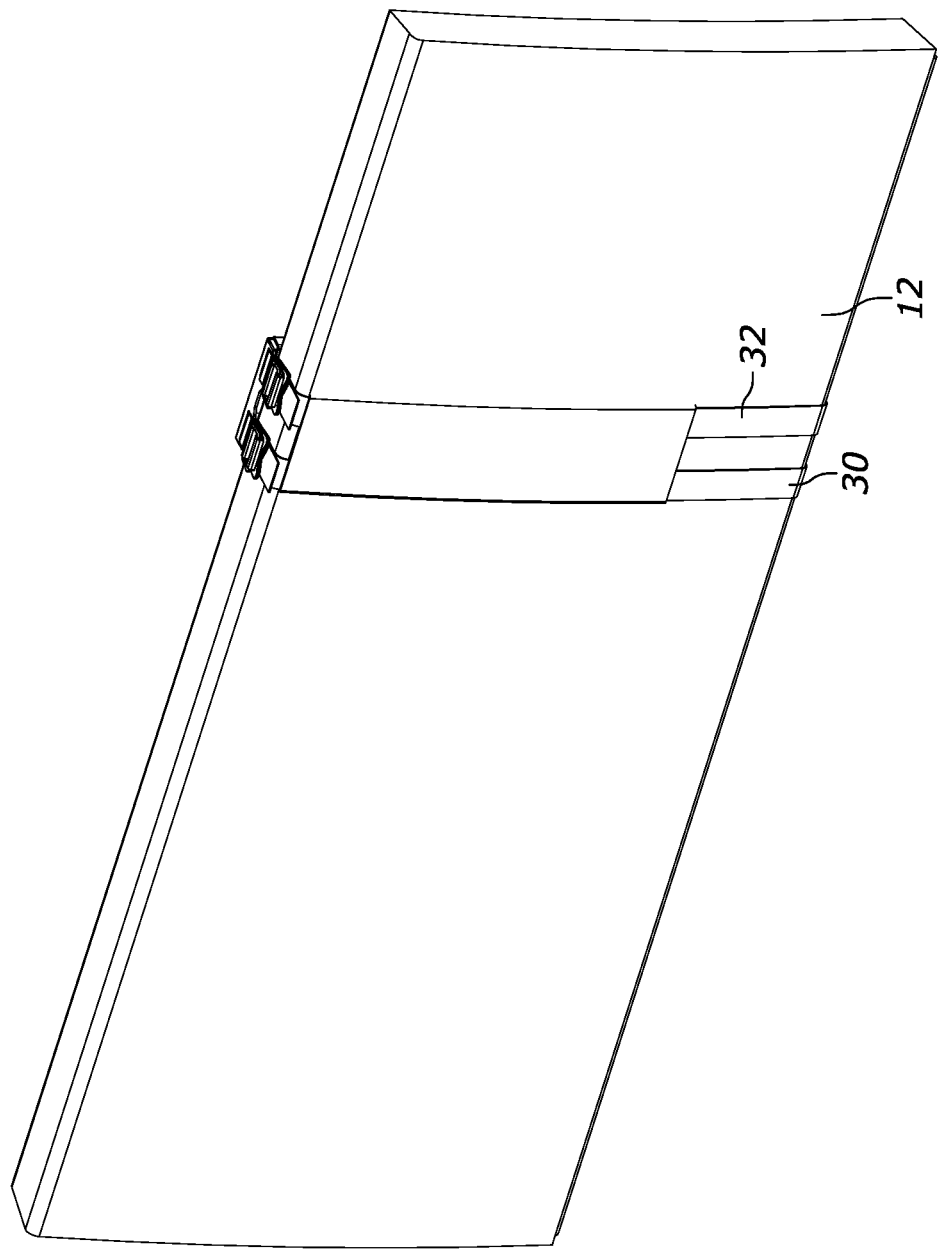
FIG. 22 is a perspective view of a branding sleeve engaged with the straps.

FIG. 22 illustrates a tailgate protector pad 2200 that can be engaged with the straps 30, 32 both to protect the tailgate 12 and to provide a branding opportunity by printing appropriate messages or trademarks on the pad 2200. The pad 2200 may be implemented by a sleeve of fabric that slips over the straps with a soft protective backing material. The pad 2200 may be extended to protect the buckles 34 and to extend to protect the tailgate bottom edge. The pad 2200 may be a single piece of fabric or may include secondary piece(s).

In some examples the rail 10 may be locked to the tailgate 12 using keyed or combination locked strap ends with cinch buckles. Cut prevention webbing such as wire embedded, or Kevlar may be used to cover certain portions of the apparatus. The interfaces that hold the work or recreational implements may also be lockable using keyed or combination locked release handles. The rail 10 may be energized by the vehicle's battery with plug in charging and/or a solar panel attachment in the event that an implement supported on the rail requires power. Plug-in power may be via a hitch plug with a 12V pinout and plug-in power may be via the battery or a fuse box. Note that a standalone battery pack may be contained entirely within or on the rail 10. The battery pack is removably engaged with the rail and can be removed for recharging.

As described above, the rail 10 supports interfaces on which are mounted various types of utility attachments or implements. The attachments (or implements) may be for recreational use for hobbies, sports, activities etc. or for vocational use for construction jobs, field workers, etc. The attachments can be designed for transport purposes while the vehicle is in operation or when the user is at the tailgate while the vehicle is parked.

As can be appreciated from the above, the attachments/implements are easily interchanged, and more than one attachment/implement may be mounted on the rail 10 at one time via respective interfaces. Without limitation, vocational attachments/implements may include toolboxes, tool racks, worktables with storage, lumber racks, computer workstations, bench vises, work lights, shade Canopies, ladder steps, solar panels, charge stations, and tailgate extension cages. Without limitation, recreational attachments/implements include bicycle repair stands, bicycle transport frame cradles, bicycle transport fork mounts, camping/tailgating tables, water containers and mounts, umbrellas, surfboard racks, ski racks and repair forks, action camera mounts, fuel can and mount, storage containers, gravity showers, basketball hoops and other tailgating games, fishing rod mounts, and rifle rests.

Figure 23:
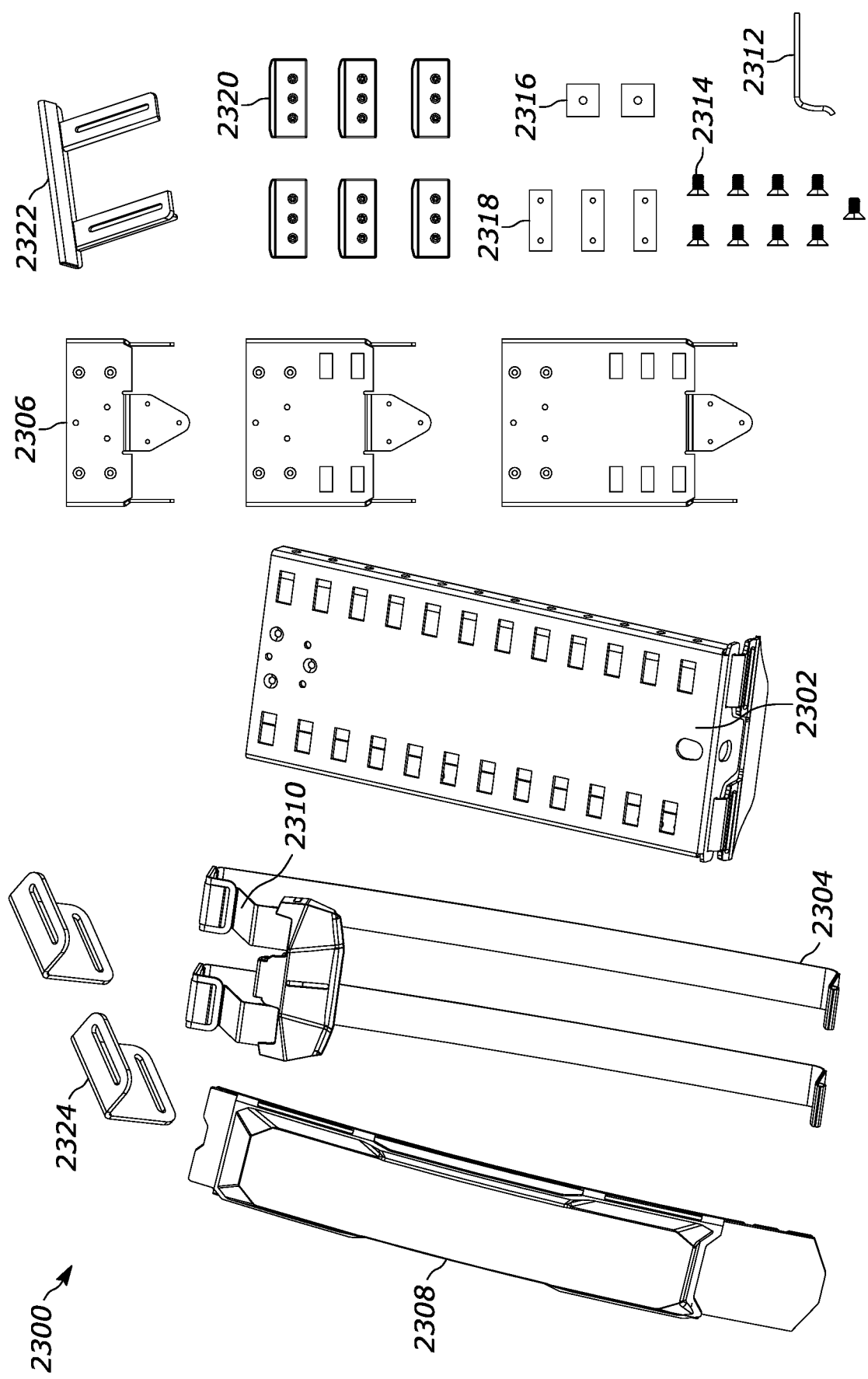
FIG. 23 illustrates components of a rail kit according to an embodiment.

FIGS. 23-40 illustrate additional features that embodiment may use in addition to or in lieu of above components. FIG. 23 illustrates a kit 2300 of parts that may be provided with any of the components described herein. In the example shown, the kit 2300 includes one or more rails 2302 such as any of the rails described herein and one or more straps 2304 to secure the rail to a tailgate. The kit 2300 also may include one or more rail extensions 2306 (three extensions shown, a short, medium, and long extension) that can be selectively engaged with the rail 2302 and that extend from the rail to establish a desired combined length.

Also, the kit 2300 may include a pad 2308 to cushion the straps, and a tightening assembly 2310 such as a latch to tighten the straps 2304 in accordance with disclosure herein. The kit of parts may also include at least one hex key 2312 and in some embodiments only one hex key 2312 and no other tools for configuring the rail assembly as discussed further below. The kit also may include one or more of the buckles described herein for receiving the straps 2304 on the end of the rail 2302 opposite the tightening assembly 2310. The kit also may include fasteners 2314 to engage a select one of the rail extensions 2306 with the rail 2302, one or more square nuts 2316, and one or more twin nuts 2318 for purposes to be shortly disclosed. Anti-slip footings 2320 may be provided as may one or more extension slides 2322. Strap brackets 2324 also may be provided in accordance with description above.

Figure 24:
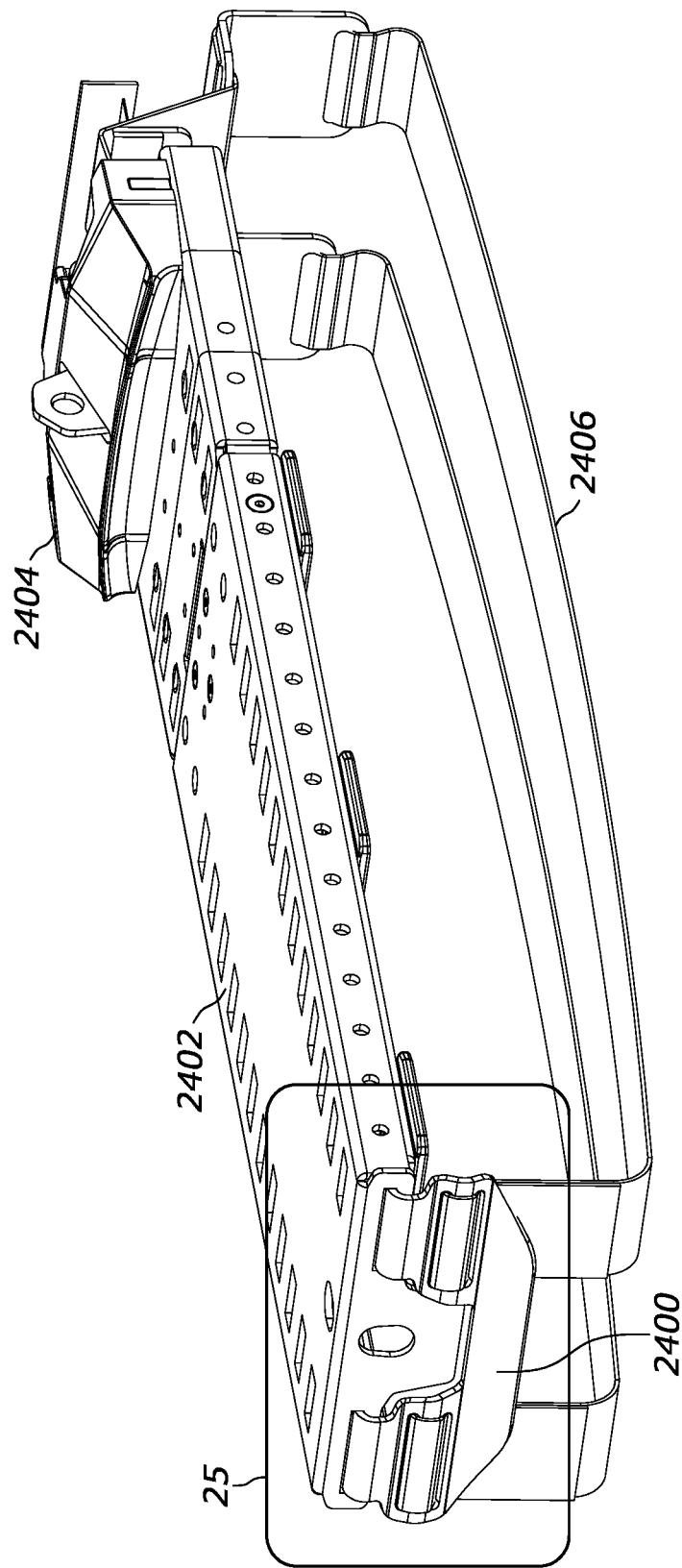
FIGS. 24-29 are isometric views illustrating a dual buckle plate for strap fixation.
Figure 25:
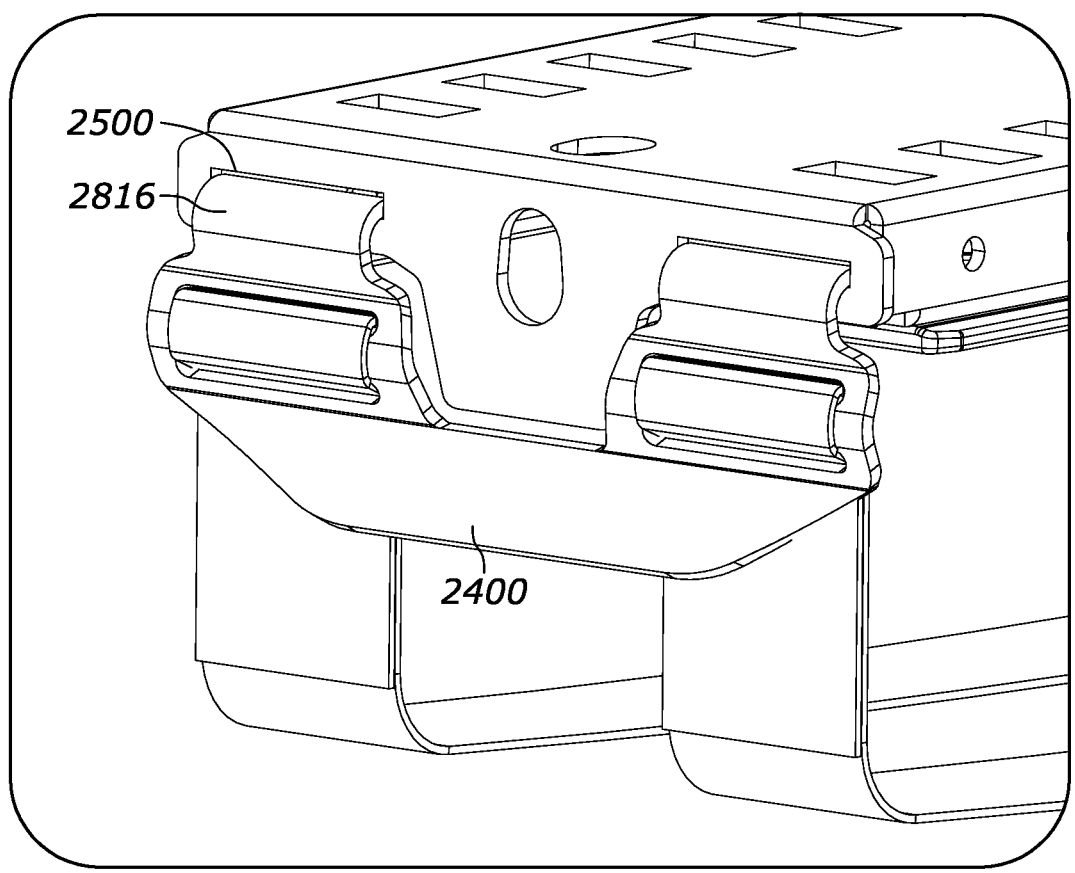
Figure 26:
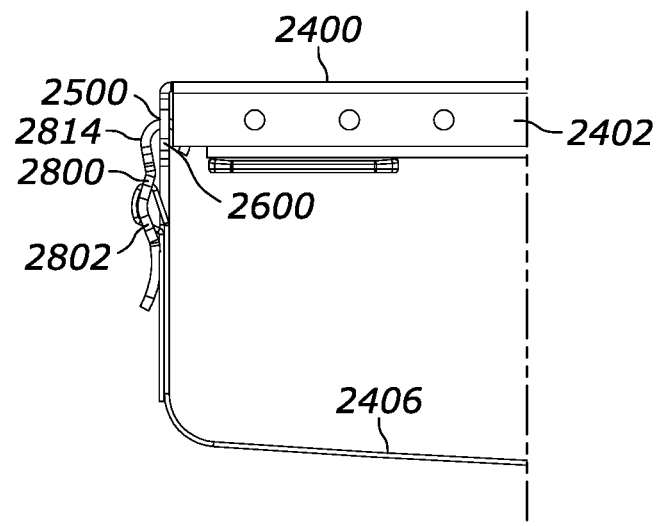
Figure 27:
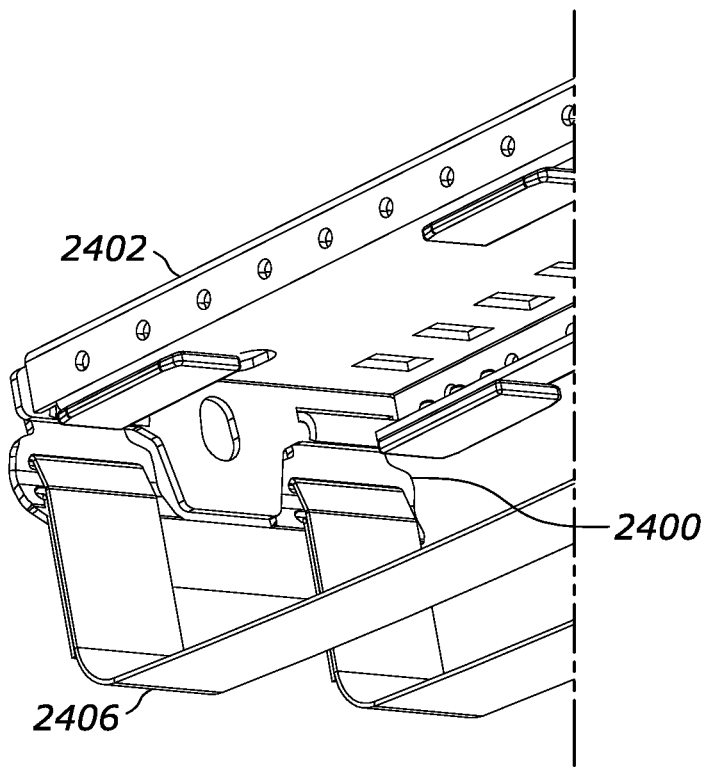

FIGS. 24-29 illustrate aspects of an embodiment of the strap buckle, in the example shown, a dual buckle plate 2400 made of a unitary metal or plastic body. FIG. 24 illustrates that the dual buckle plate 2400 is disposed at an end of a rail assembly 2402 opposite the end of the rail assembly at which a tightening assembly including a latch 2404 is disposed, to hold two straps 2406 between the buckle plate 2400 and latch 2404. FIG. 25 is a detail of FIG. 24 taken in the area "25" in FIG. 24, FIG. 26 is a side view of that detail, and FIG. 27 is a rear view of that detail.

Figure 28:
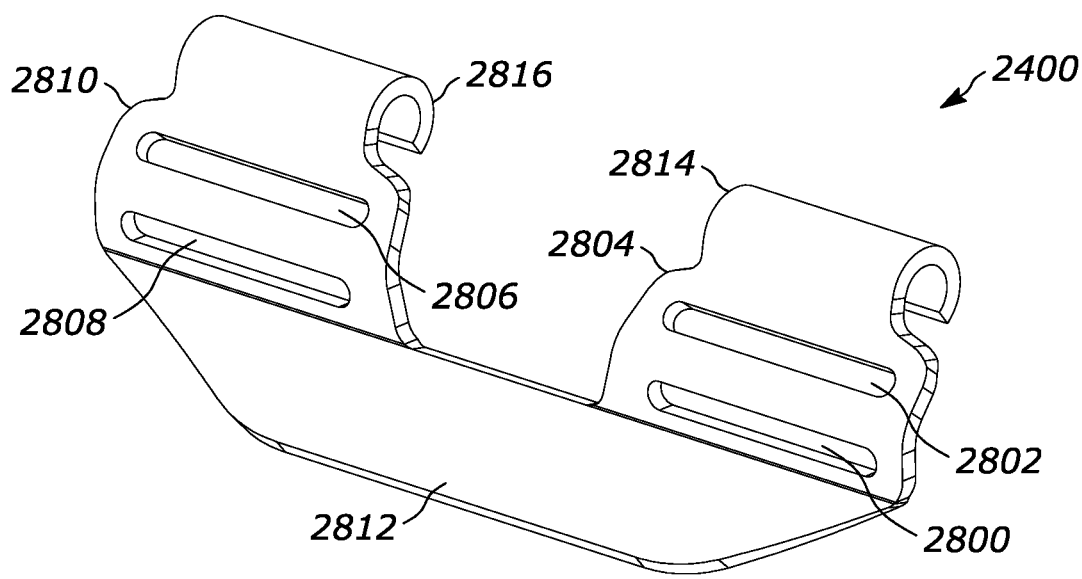
Figure 29:
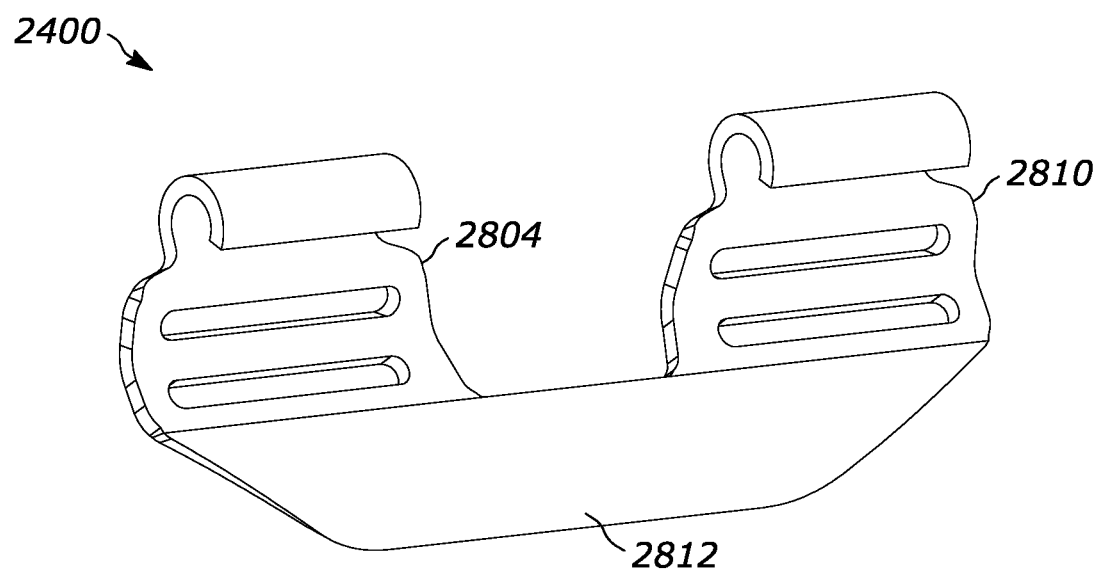

FIGS. 28 and 29 show front and back isometric views of the buckle plate 2400. As shown, the unitary body of the plate 2400 includes left and right strap slots for engaging the left and right flexible straps 2406, respectively. In the example, the plate 2400 includes two parallel spaced-apart right strap slots 2800, 2802 formed in a right buckle portion 2804. The right strap 2406 is threaded through the right strap slots 2800, 2802 as shown in, e.g., FIG. 26. Similarly, the plate 2400 includes two parallel spaced-apart left strap slots 2806, 2808 formed in a left buckle portion 2810. The left strap is threaded through the left strap slots 2806, 2808. The left and right buckle portions 2810, 2804 are spaced from each other as shown and are integral with a handle portion 2812 that spans the buckle portions 2810, 2804 from edge to edge as shown.

Each buckle portion 2804, 2810 is formed on its edge opposite the handle portion 2812 with a respective open cylindrical channel 2814, 2816 that as best shown in FIGS. 25 and 26 extends through a respective opening 2500 in the end of the rail 2402 to rotatably engage a bar or other structure 2600 of the rail 2402 that is adjacent the opening.

The buckle plate 2400 provides manufacturing and inventory convenience, along with better styling and functionality for the user in that the straps can be adjusted in concert by moving the handle portion 2812.

Figure 30:
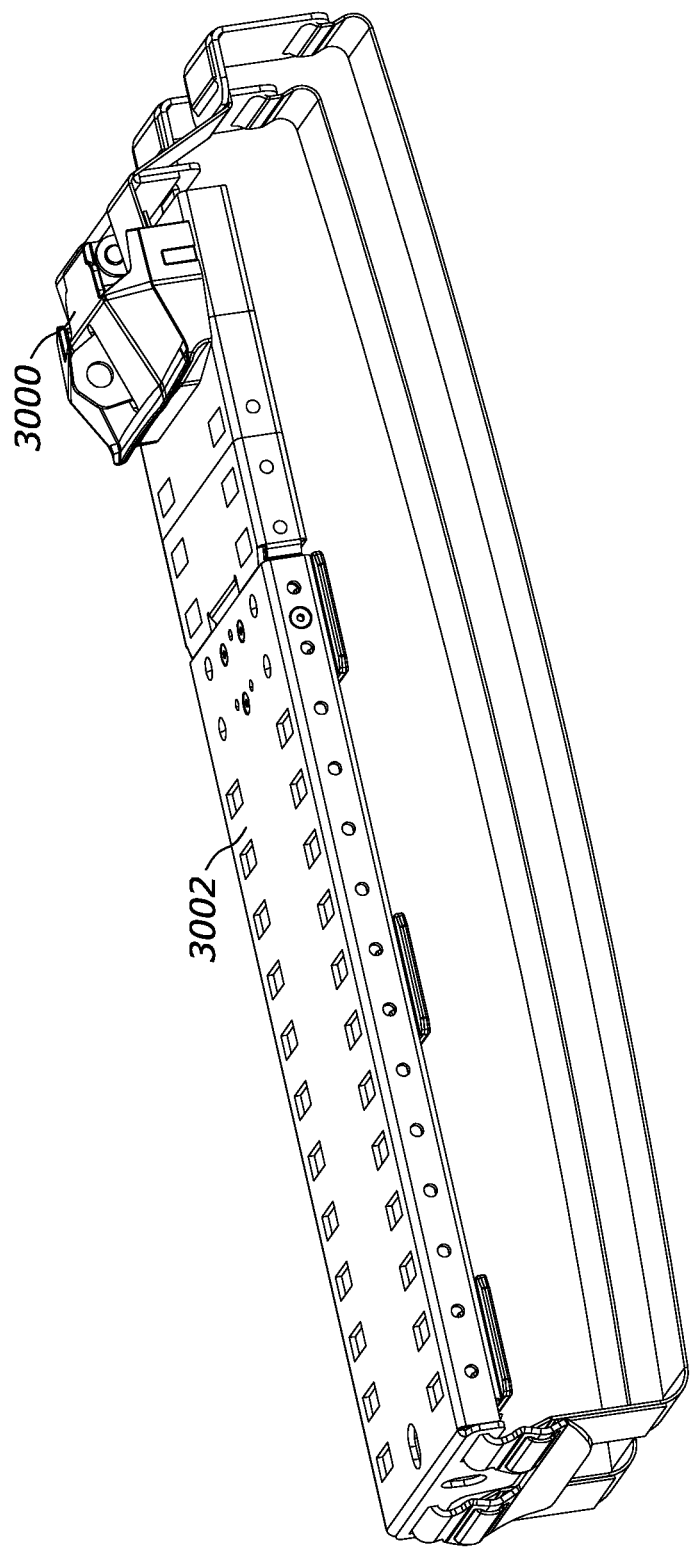
FIGS. 30-32 are isometric views illustrating a locking feature for the strap latch on the end of the rail opposite the dual buckle plate.
Figure 31:
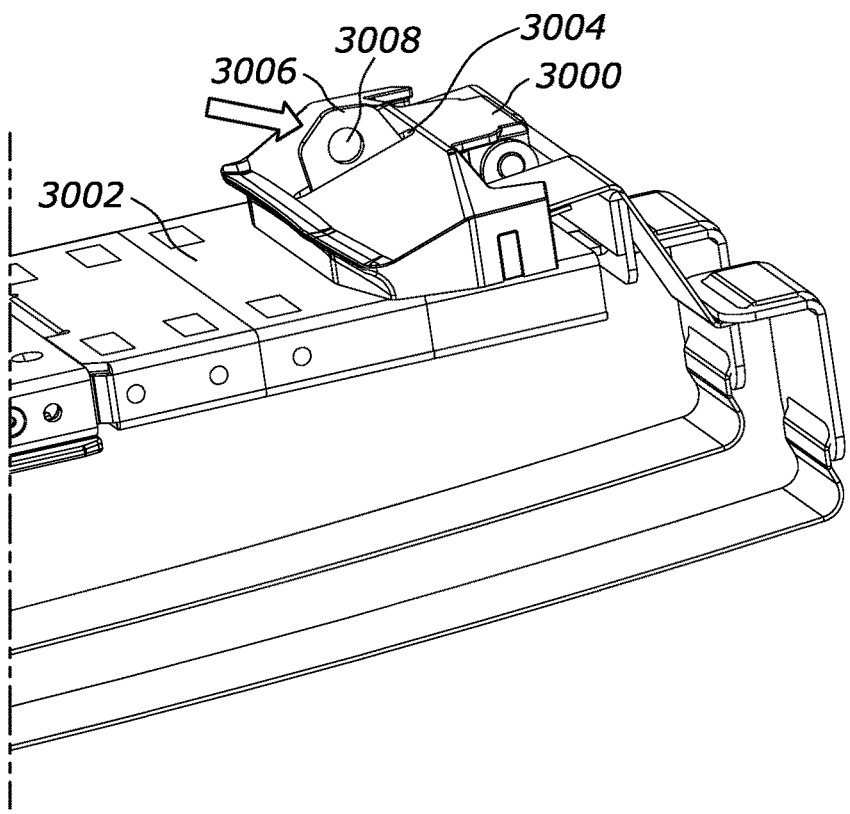
Figure 32:
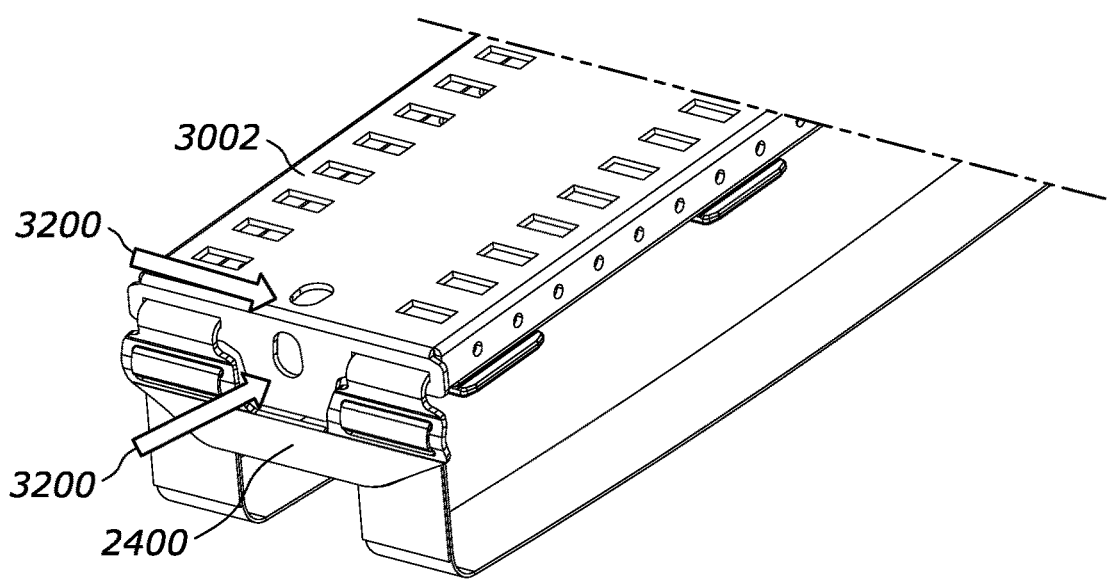
Figure 33:
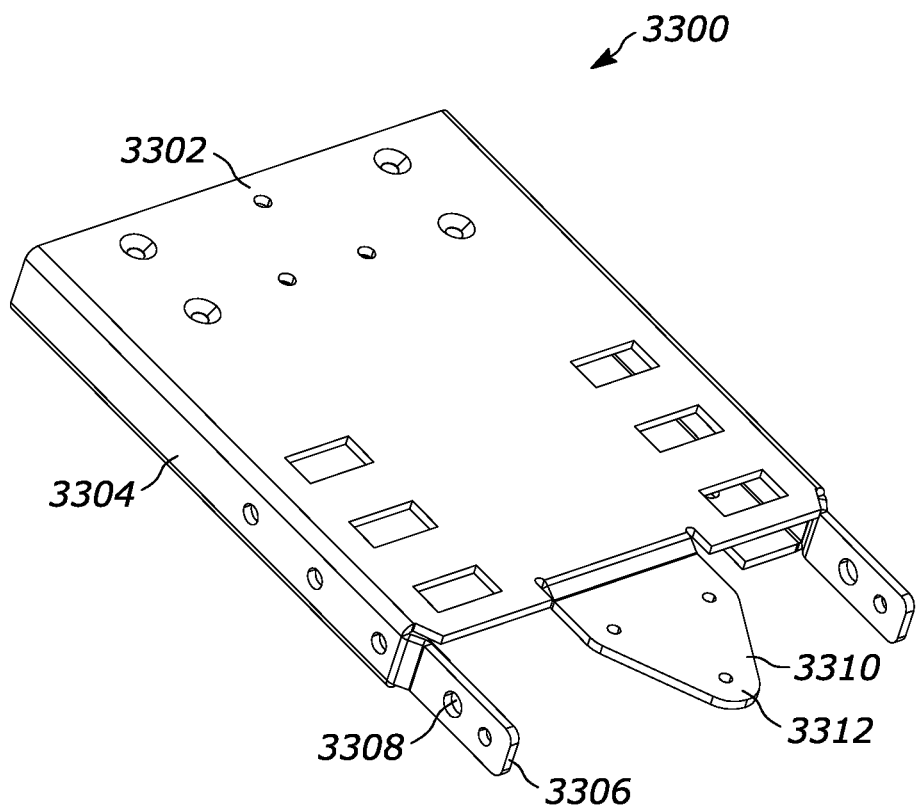
FIGS. 33 and 34 are isometric views illustrating rail extension features.

FIGS. 30-32 illustrate aspects of an embodiment of a flippable latch 3000 of the tightening assembly that can be moved to a tightened configuration shown in FIG. 30 and accompanying detail view in FIG. 31, in which the latch is disposed substantially flush against the rail 3002. The latch also may be moved in accordance with prior disclosure to a loosen configuration, in which the latch is pivoted upward from the rail.

In the example shown, the latch 3000 is formed with a slot 3004 for receiving, in the tightened configuration, a locking tab 3006 extending from the rail 3002. The locking tab 3006, which may be configured as a flat plate, is formed with a hole 3008 for receiving the shackle of a lock such as a padlock to lock the rail in the tightened configuration in a hasp-like structure to prevent theft and tampering. The padlock may be secured to the bed of the truck using a security cable. The same cable can be used to lock a bike or other valuable item FIG. 32 illustrates that to frustrate a thief who might disassemble the main rail 3002 from the rail extension, the main rail 3002 can be separately locked if desired by means of a lock that can be engaged with one or more locking holes 3200 near the buckle plate 2400.

Turning to a rail extension 3300 that may implement, e.g., any of the rail extensions 2306 shown in FIG. 23, the extension 3300 includes a flat parallelepiped-shaped metal or plastic plate 3302 with opposed parallelepiped-shaped sides 3304 depending down from opposite edges of the plate 3302 and perpendicular to the plate 3302. Extending forward of the front edge of the plate 3302 from each side 3304 is a respective side tang 3306 with at least one hole 3308 each to receive a respective connector oriented in a first dimension to engage the side tangs with the rail as will be more discussed momentarily. Also, the rail extension 3300 includes, between the side tangs 3306, a middle tang 3310 with plural holes 3312 to receive respective connectors oriented in a second dimension orthogonal to the first dimension to engage the middle tang with the rail. In the example shown, the first dimension is sideways, i.e., parallel to the plate 3302 between the side tangs 3306, while the second dimension is up-and-down, i.e., perpendicular to the plate 3302. In some examples, the holes 3308 in the side tangs 3306 are not threaded, whereas the holes 3312 in the middle tang 3310 are threaded. Note further that the middle tang 3310 is oriented parallel to and may be co-planar with the plate 3302.

Figure 34:
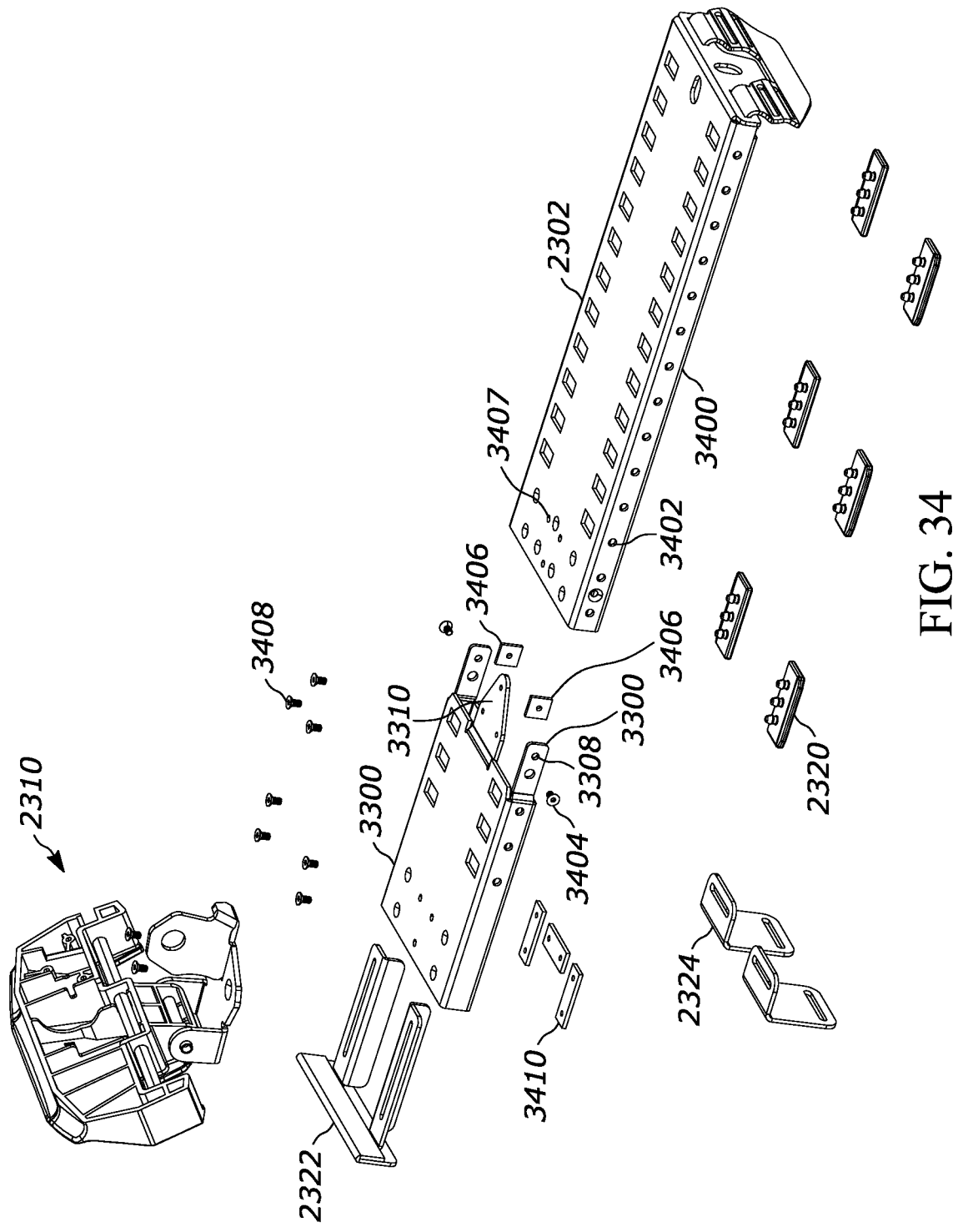
Figure 35:
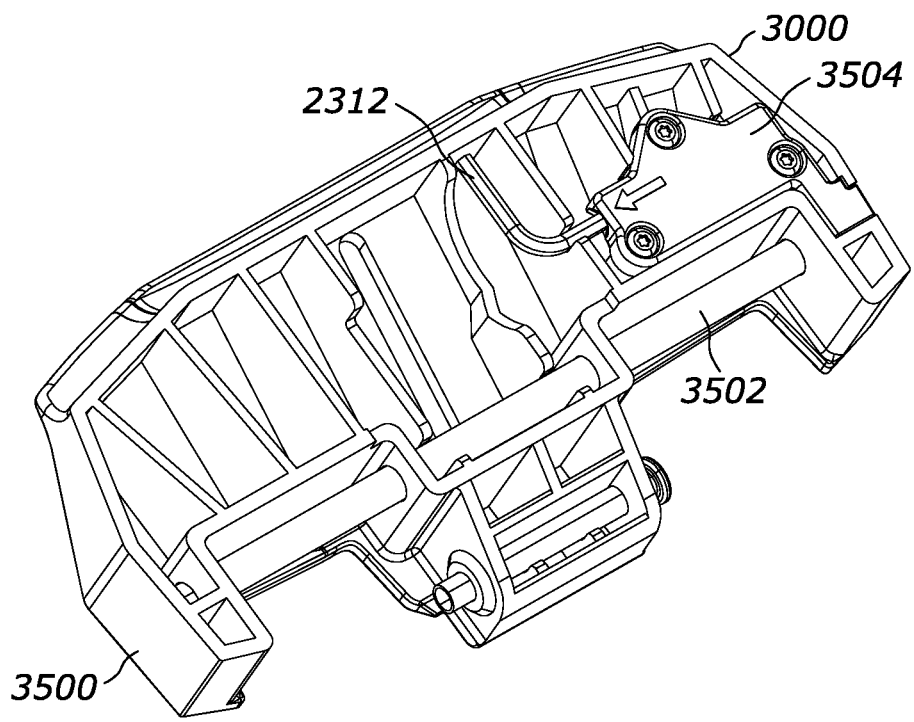
FIGS. 35-38 are isometric views illustrating a hex key mounting feature in the strap latch.
Figure 36:
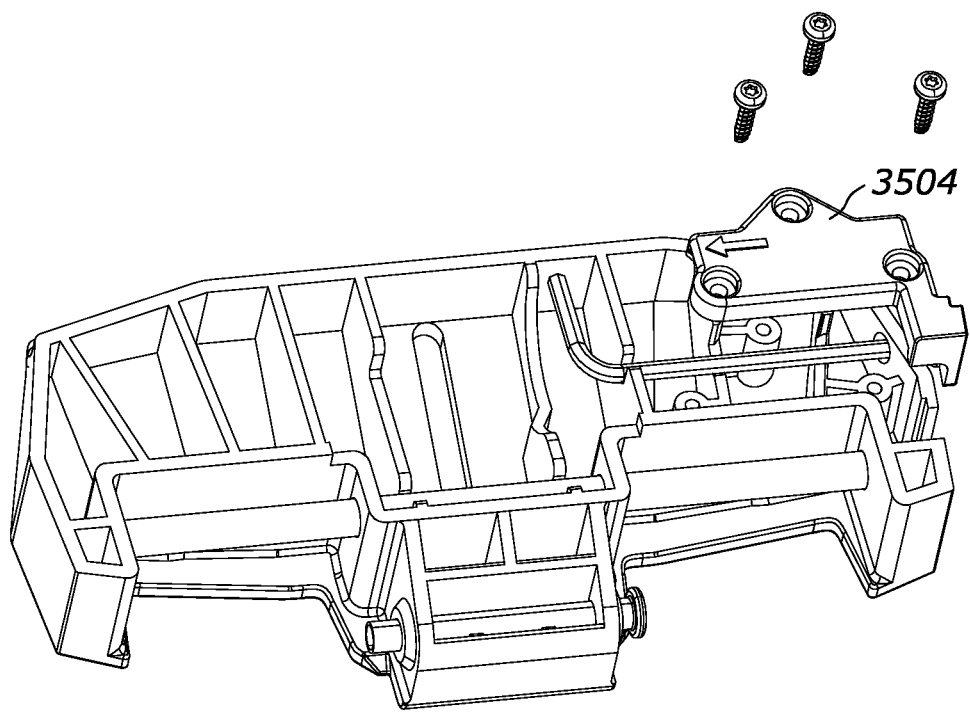
Figure 37:
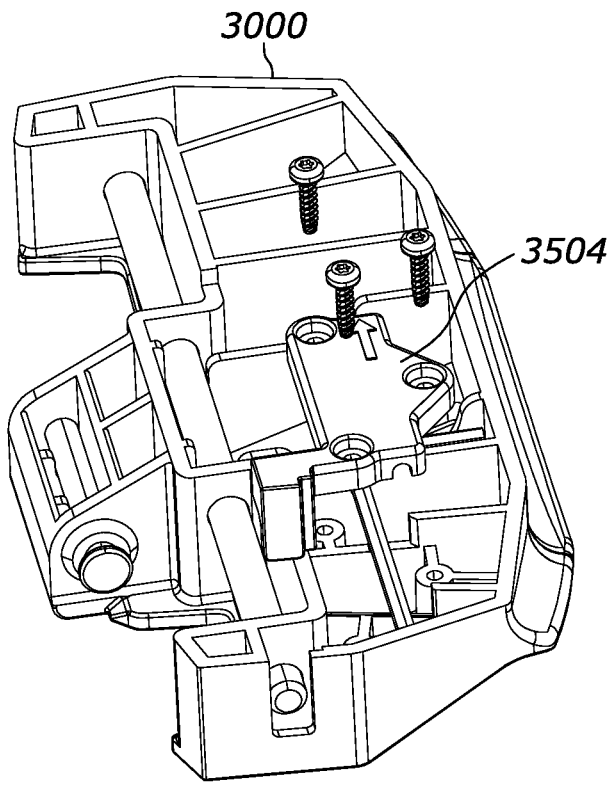
Figure 38:
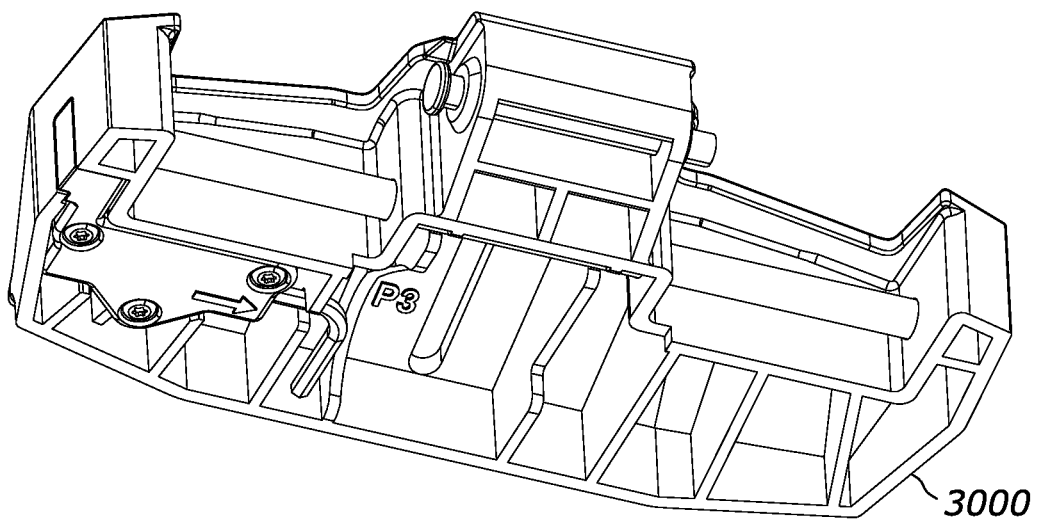

FIG. 34 illustrates further. A rail such as, for example, the rail 2302 shown in FIG. 23 is engaged with the rail extension 3300 to lengthen the overall rail/extension assembly using the tangs 3306, 3310. Note that the extension slide 2322 of FIG. 23 may be slid into the end of the rail extension 3300 that is opposite the rail 2302.

In greater specificity, the side tangs 3306 of the rail extension 3300 can be positioned flush against inside surfaces of respective side flanges 3400 of the rail 2302, with the hole or holes 3308 of the side tangs being registered with corresponding holes 3402 in the side flanges 3400. A respective threaded fastener 3404 can extend through each side tang hole 3308 and side flange hole 3402 and engage a respective threaded square nut 3406 on the interior side of the flange 3400, which resists rotation owing to its square shape mating with the shape of the rail 2302 with flange 3400.

Additionally, with the middle tang 3310 positioned flat against the top surface of the rail 2302 and with the middle tang holes registered with respective holes 3407 in the top surface of the rail, fasteners 3408 (in the example shown, three) can extend through the respective middle tang holes 3312 and rail holes 3407 and engage respective rectangle nuts 3410 on the opposite (bottom) side of the rail 2302. Each rectangle nut 3410 can be formed with two threaded holes for versatility of installation. Additional components from FIG. 23 also appear in FIG. 34.

In earlier examples tie plates are used to connect the main rail and the subsequent rail extensions, with standard nuts and bolts used to fasten them all together, whereas in the example of FIG. 34 no tie plates need be used, and square and rectangle nuts are used to connect the rail to the extension without need for a socket driver to secure. Only a single tool, in the example shown, a 2.5 mm hex wrench for M4 flathead screws is needed to adjust and configure the rail. Increasing simplicity, ease of use, and decreasing cost.

Indeed and turning now to 35-38, the L-shaped hex key 2312 shown in FIG. 23 may be engaged with a complementarily-shaped channel, in, for example, the underside of the latch 3000 shown in FIG. 30, in an interference fit so that it is always housed with the rail assembly for removing by hand. The hex key 2312 is thus removably engaged with the apparatus and configured to be manipulated to adjust and configure the apparatus. The hex key is the only tool needed to adjust and configure the rail assembly. Also, sides 3500 of the latch 3000 may double as a blocking cap for the strap rod 3502 in the latch. The hex key is covered when the latch is down so that it is fully contained and lockable when a pad lock is through the lock tab. For further security, a blocking plate 3504 may be placed over the hex key and screwed onto the latch as shown.

Figure 39:
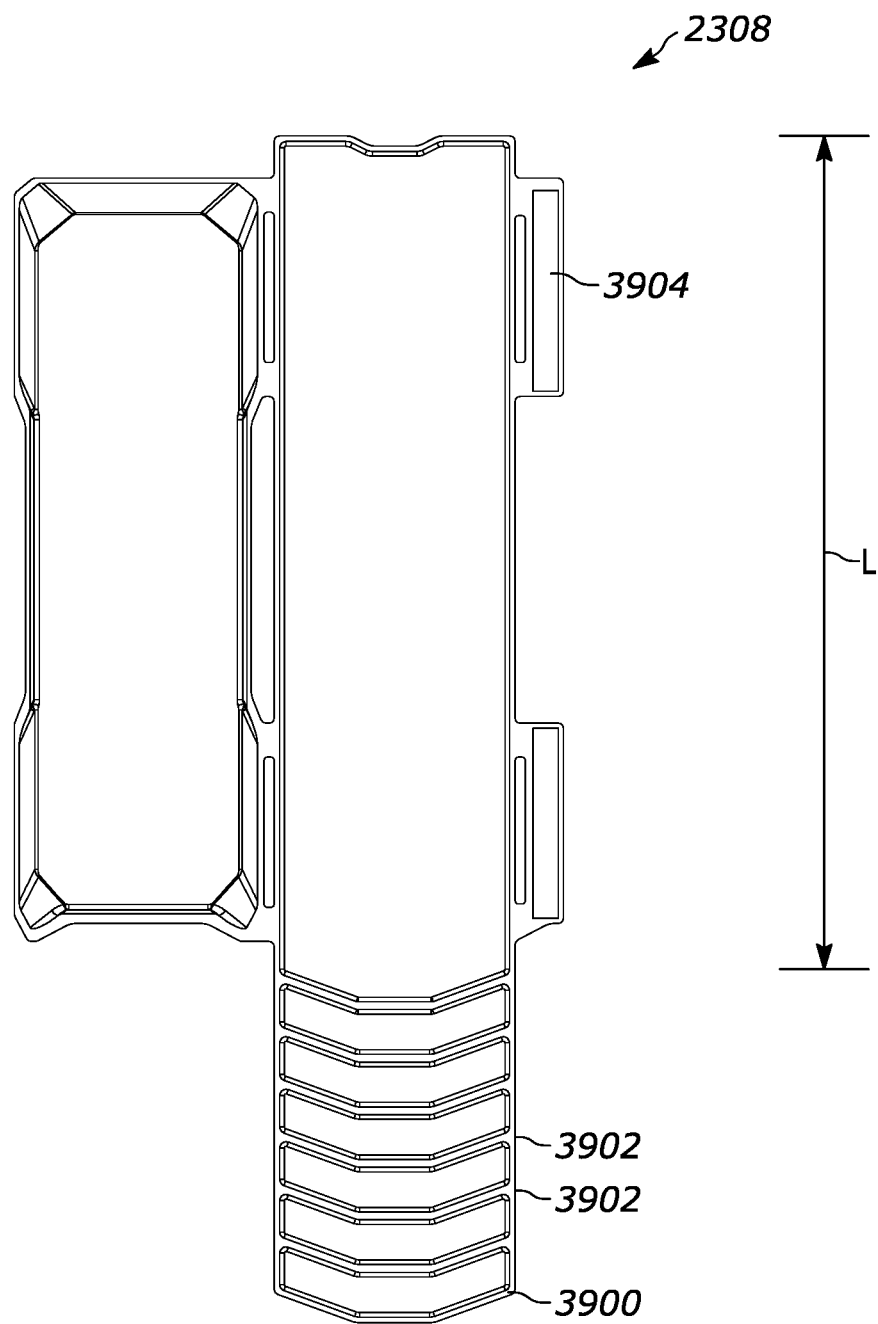
FIGS. 39 and 40 are isometric views illustrating trimmable strap pad features.
Figure 40:
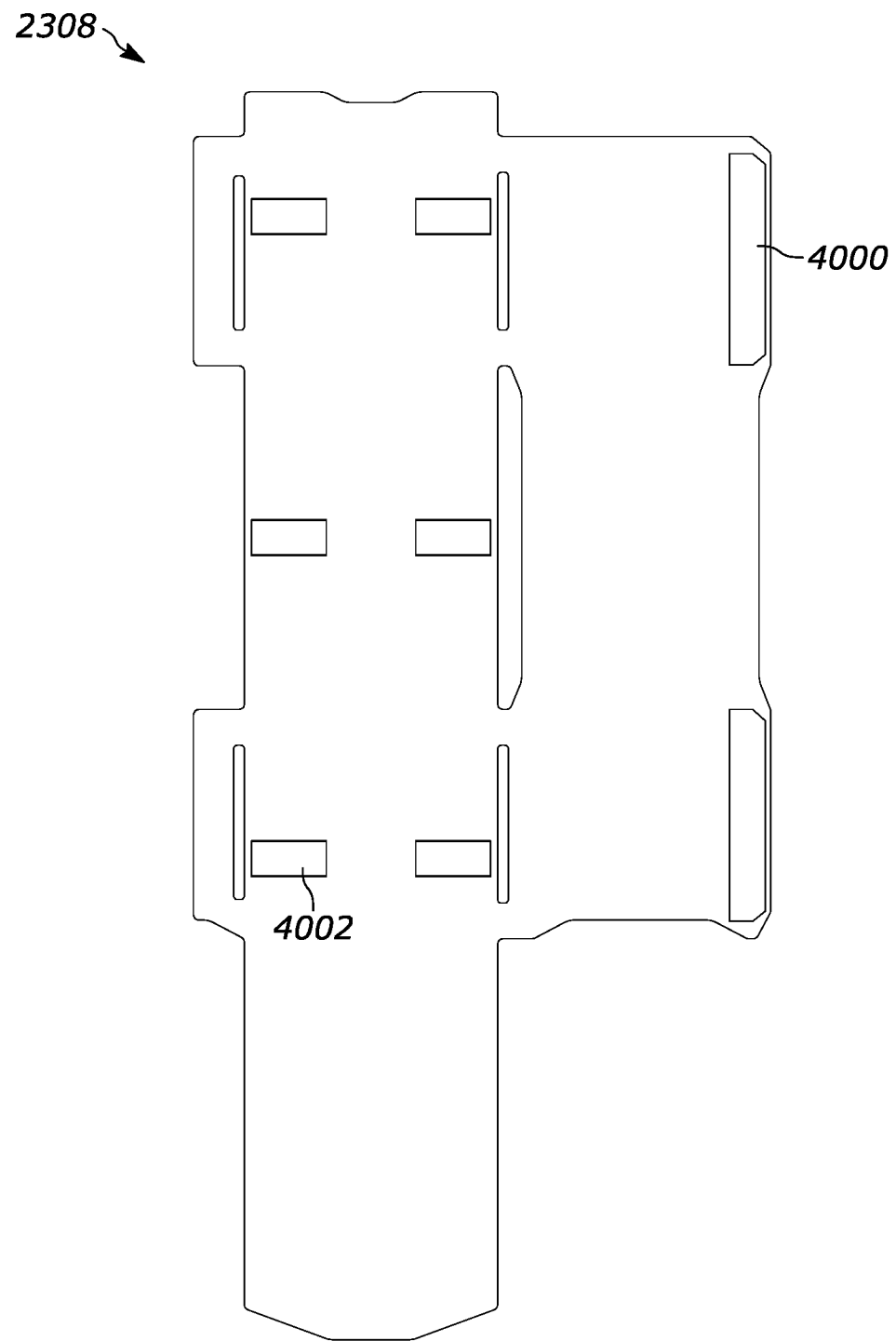

FIGS. 39 and 40 illustrate features of the pad 2308 shown in FIG. 23. The overall length of the pad 2308 is greater than a minimum length "L" for the shallowest envisioned tailgates, with a tail segment 3900 beyond the minimum length "L" being trimmable at various lengths as needed to fit deeper tailgates. To this end, the pad 2308 is made of material that is thermoformed under heat and pressure to reduce fraying when trimmed. It is thermoformed under heat and pressure so that the foam substrates are bonded to the fabrics and prevent fraying if the product is hand trimmed by the user. Moreover, the tail segment 3900 is formed with a series of parallel side-to-side depressions 3902 to guide trimming.

Loop Velcro tabs 3904 may be provided on the tail segment 3900 to engage hook Velcro tabs 4000 (FIG. 40). If desired, elastic bands 4002 (in the embodiment shown, three rows of two bands 4002 each) can be provided for the straps.

Thus, the pad 2308 reduces manufacturing costs and improves product performance by being sized in a single length for the largest tailgates and by being trimmable to fit smaller tailgates. If the strap pad is too long, the extra length will interfere with the straps and jam the tailgate when closing it. If the strap pad is too short, it will not adequately protect the tailgate paint surface.

While the particular TAILGATE UTILITY RAIL AND ATTACHMENTS is herein shown and described in detail, it is to be understood that the subject matter which is encompassed by the present invention is limited only by the claims.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

What is claimed is:

1. An apparatus comprising:
   a flat elongated rail formed with a first surface bounded by left and right edges, the rail comprising openings in the first surface for receiving a portion of an attachment base of an implement to be carried on a truck;
   left and right flexible straps extending the length of the first surface and facing a second surface of the rail that is opposed to the first surface, the straps being coupled to the first end of the rail and extending to the second end of the rail;
   a tightening assembly receiving the straps for tightening and loosening the straps to engage the apparatus with a tailgate of a truck with the tailgate between the straps and the rail; and
   at least one feature selected from:
   (a) at least one dual buckle plate comprising a unitary body formed with left and right strap slots for engaging the left and right flexible straps, respectively;
   (b) at least one flippable latch of the tightening assembly, the flippable latch being movable to a tightened configuration, in which the latch is disposed substantially flush against the rail, and a loosen configuration, in which the latch is pivoted upward from the rail, the latch being formed with a slot for receiving, in the tightened configuration, a locking tab extending from the rail, the locking tab comprising a hole for receiving a lock to lock the rail in the tightened configuration;
   (c) at least one rail extension engageable with the rail for extending longitudinally therefrom, the rail extension comprising two side tangs with at least one hole each to receive a respective connector oriented in a first dimension to engage the side tangs with the rail, the rail extension comprising a middle tang with plural holes to receive respective connectors oriented in a second dimension orthogonal to the first dimension to engage the middle tang with the rail;
   (d) a hex key removably engaged with the apparatus and configured to be manipulated to adjust and configure the apparatus;
   (e) at least one pad disposed along the rail and comprising material thermoformed under heat and pressure to reduce fraying when trimmed.

2. The apparatus of claim 1, wherein the feature comprises the at least one dual buckle plate comprising a unitary body formed with left and right strap slots for engaging the left and right flexible straps, respectively.

3. The apparatus of claim 1, wherein the feature comprises the at least one flippable latch of the tightening assembly.

4. The assembly of claim 3, wherein the rail is formed with at least one locking hole for receiving a lock therein.

5. The apparatus of claim 1, wherein the feature comprises the at least one rail extension engageable with the rail for extending longitudinally therefrom.

6. The apparatus of claim 5, wherein the holes of the side tangs are not threshed and at least one of the holes of the middle tang is threaded.

7. The apparatus of claim 1, wherein the feature comprises the hex key.

8. The apparatus of claim 1, wherein the feature comprises the at least one pad.

9. The apparatus of claim 8, wherein the pad comprises depressions to guide trimming.

10. The apparatus of claim 1, comprising the attachment base of the implement.

11. The apparatus of claim 10, comprising the implement.

12. The apparatus of claim 1, comprising the truck.

13. A kit of parts, comprising:
    at least one rail;
    at least two straps to secure the rail to a tailgate;
    one or more rail extensions selectively engageable with the rail and extendable therefrom;
    at least one pad to cushion the rail; and
    at least one latch to tighten the straps.

14. The kit of parts of claim 13, comprising:
    at least one hex key to configure the rail.

15. The kit of parts of claim 13, comprising at least one buckle to receive the straps.

16. The kit of parts of claim 13, comprising plural fasteners to engage the rail extension with the rail.

\* \* \* \* \*